(12) United States Patent
Mitsuta et al.

(10) Patent No.: US 9,796,330 B2
(45) Date of Patent: Oct. 24, 2017

(54) WORKING VEHICLE PERIPHERY MONITORING SYSTEM AND WORKING VEHICLE

(71) Applicant: Komatsu Ltd., Tokyo (JP)

(72) Inventors: Shinji Mitsuta, Hiratsuka (JP); Takeshi Kurihara, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/825,175

(22) PCT Filed: Oct. 19, 2012

(86) PCT No.: PCT/JP2012/077062
§ 371 (c)(1),
(2) Date: Mar. 20, 2013

(87) PCT Pub. No.: WO2014/045457
PCT Pub. Date: Mar. 27, 2014

(65) Prior Publication Data
US 2015/0217690 A1 Aug. 6, 2015

(30) Foreign Application Priority Data
Sep. 21, 2012 (JP) ................................. 2012-208733

(51) Int. Cl.
*B60R 1/00* (2006.01)
*G06T 3/40* (2006.01)
(Continued)

(52) U.S. Cl.
CPC ............ *B60R 1/00* (2013.01); *G06K 9/00805* (2013.01); *G06T 3/4038* (2013.01); *G06T 11/00* (2013.01);
(Continued)

(58) Field of Classification Search
CPC ................ B60R 1/00; B60R 2300/303; B60R 2300/607; G06K 9/00805; G06T 11/00; G06T 3/4038; H04N 7/18; H04N 7/181
(Continued)

(56) References Cited

U.S. PATENT DOCUMENTS 6,476,731 B1* 11/2002 Miki .................... B60Q 1/0023
340/435
7,145,519 B2* 12/2006 Takahashi .............. G08G 1/168
345/7
(Continued)

FOREIGN PATENT DOCUMENTS

| CA | 2815831 A1 | 3/2014 |
| CN | 102303568 A | 1/2012 |

(Continued)

OTHER PUBLICATIONS

Press release: Hitachi Construction Machinery Jointly Develops Overview Monitoring System with Clarion, Feb. 28, 2011, <http://www.hitachi-c-m.com/za/news/press/PR20110228092631496.html>, pp. 1-2.*
(Continued)

*Primary Examiner* — Christopher S Kelley
*Assistant Examiner* — Kathleen Walsh
(74) *Attorney, Agent, or Firm* — Locke Lord LLP

(57) ABSTRACT

A working vehicle periphery monitoring system includes: image capturing devices attached to a working vehicle with a vessel and capturing the periphery of the working vehicle to output image information; a bird's eye image synthesizing unit synthesizing the image information to generate a bird's eye image information for displaying bird's eye images of the working vehicle and the periphery thereof; and a display control unit displaying at least one of a first bird's eye image obtained by superimposing a first vessel image including the
(Continued)

vessel other than a part of the vessel at a rear side of the working vehicle on an area of the working vehicle in the bird's eye image and a second bird's eye image obtained by superimposing a second vessel image including all of the vessel on the area.

12 Claims, 12 Drawing Sheets

(51) Int. Cl.
*H04N 7/18* (2006.01)
*G06T 11/00* (2006.01)
*G06K 9/00* (2006.01)

(52) U.S. Cl.
CPC .............. *H04N 7/18* (2013.01); *H04N 7/181* (2013.01); *B60R 2300/303* (2013.01); *B60R 2300/607* (2013.01)

(58) Field of Classification Search
USPC .................................................. 348/143, 148
See application file for complete search history.

(56) References Cited

U.S. PATENT DOCUMENTS

| | | | | |
|---|---|---|---|---|
| 7,728,879 | B2* | 6/2010 | Ishii | G06T 3/4038 348/148 |
| 2003/0197660 | A1* | 10/2003 | Takahashi | G08G 1/168 345/7 |
| 2004/0263647 | A1* | 12/2004 | Yamaguchi | G07C 5/085 348/240.2 |
| 2006/0227138 | A1* | 10/2006 | Oizumi | B60R 1/00 345/428 |
| 2007/0057816 | A1* | 3/2007 | Sakakibara | B62D 15/0275 340/932.2 |
| 2007/0273554 | A1* | 11/2007 | Sakakibara | B62D 15/0275 340/932.2 |
| 2008/0043113 | A1* | 2/2008 | Ishii | G06T 3/4038 348/218.1 |
| 2008/0231702 | A1* | 9/2008 | Matsumoto | B60R 1/00 348/148 |
| 2009/0009308 | A1* | 1/2009 | Date | B60R 1/00 340/439 |
| 2009/0073263 | A1* | 3/2009 | Harada | B60R 1/00 348/148 |
| 2009/0089703 | A1* | 4/2009 | Kim | E02F 9/26 715/772 |
| 2009/0092334 | A1* | 4/2009 | Shulman | G01C 21/3647 382/284 |
| 2009/0309970 | A1 | 12/2009 | Ishii et al. | |
| 2010/0066833 | A1* | 3/2010 | Ohshima | B60R 1/00 348/148 |
| 2010/0092042 | A1* | 4/2010 | Asari | B60R 1/00 382/106 |
| 2010/0245577 | A1* | 9/2010 | Yamamoto | B60R 1/00 348/148 |
| 2011/0001819 | A1* | 1/2011 | Asari | G01C 21/3667 348/113 |
| 2011/0025848 | A1* | 2/2011 | Yumiba | B60R 1/00 348/148 |
| 2011/0044505 | A1* | 2/2011 | Lim | F16P 3/14 382/103 |
| 2011/0063444 | A1* | 3/2011 | Okamoto | B60R 1/00 348/148 |
| 2011/0292079 | A1* | 12/2011 | Hosoi | B62D 15/0275 345/632 |
| 2011/0317014 | A1* | 12/2011 | Onaka | B60R 1/00 348/148 |
| 2012/0062743 | A1* | 3/2012 | Lynam | B60Q 9/005 348/148 |
| 2012/0120240 | A1* | 5/2012 | Muramatsu | H04N 7/181 348/148 |
| 2012/0127312 | A1* | 5/2012 | Nagamine | B60R 1/00 348/148 |
| 2012/0140073 | A1* | 6/2012 | Ohta | B60R 25/1012 348/148 |
| 2012/0200664 | A1* | 8/2012 | Lang | B60R 1/00 348/36 |
| 2012/0229645 | A1* | 9/2012 | Yamada | B60Q 1/2665 348/148 |
| 2012/0257058 | A1* | 10/2012 | Kinoshita | H04N 7/181 348/148 |
| 2012/0320213 | A1* | 12/2012 | Ikeda | B60R 1/00 348/148 |
| 2012/0327238 | A1* | 12/2012 | Satoh | B60R 1/00 348/148 |
| 2015/0222858 | A1* | 8/2015 | Tanuki | B60R 1/00 348/148 |

FOREIGN PATENT DOCUMENTS

| | | | |
|---|---|---|---|
| JP | 2010-093605 A | | 4/2010 |
| JP | 2011-025874 A | | 2/2011 |
| JP | 2011161935 A | * | 8/2011 |
| JP | 2011-245970 A | | 12/2011 |

OTHER PUBLICATIONS

Office Action dated May 16, 2014, issued for the corresponding Canadian patent application No. 2,817,396.

Press release: Hitachi Construction Machinery Jointly Develops Overview Monitoring System with Clarion, dated Jan. 24, 2011, Publisher: Hitachi Construction Machinery Co., Ltd., [Online] http://wvvw.hitachi-kenki.co.jp/news/press/PR20110121113934973,html.

Press release: Hitachi Construction Machinery Launches "SkyAngle" for supporting Safety Checks around Construction Machinery, dated Sep. 20, 2012, Publisher: Hitachi Construction Machinery Co., Ltd., [Online] http://www.hitachi-kenki.co.jp/news/press/PR2012091213053168.html>.

International Search Report dated Jan. 15, 2013, issued for PCT/JP2012/077062.

* cited by examiner

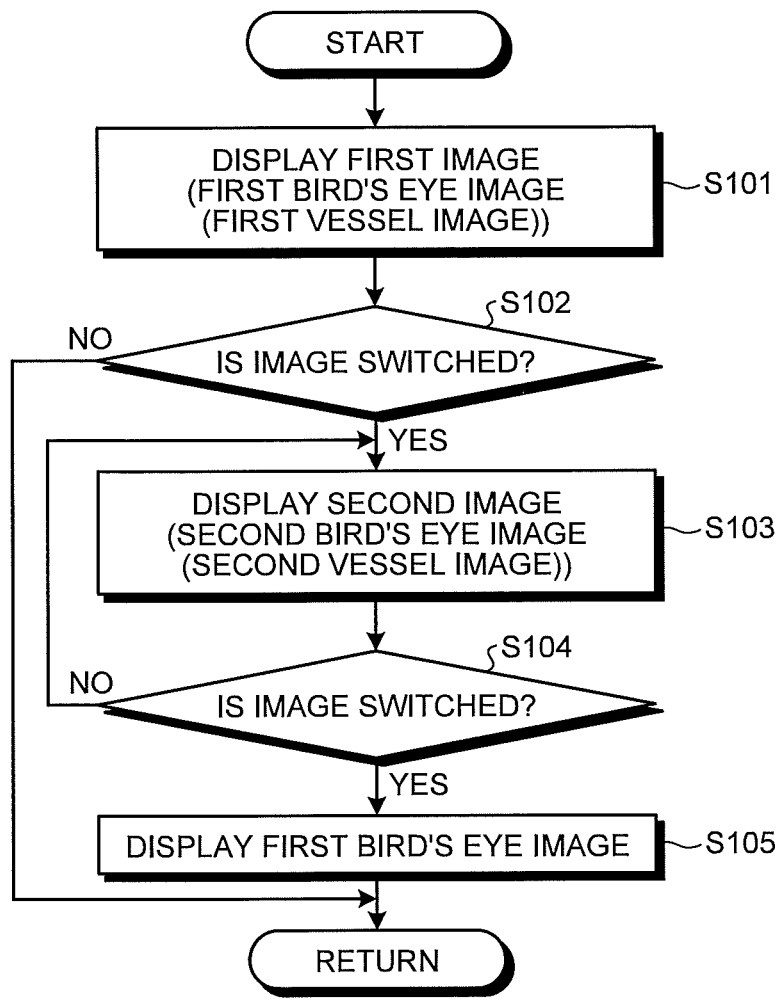

WORKING VEHICLE PERIPHERY MONITORING SYSTEM AND WORKING VEHICLE

FIELD

The present invention relates to a technology of monitoring a periphery of a working vehicle.

BACKGROUND

In a civil engineering work site or a quarry site of a mine, various working vehicles such as a dump truck and an excavator are operated. Particularly, a superjumbo working vehicle is used in a mine. Since such a working vehicle has a vehicle width, a vehicle height, and a longitudinal length noticeably larger than those of a general vehicle, it is difficult for an operator to check and understand a peripheral circumstance by a side mirror and the like. For this reason, there is proposed a device which monitors a periphery of a vehicle as a technique for assisting a running operation by helping the operator to simply recognize a vehicle periphery environment. For example, there is disclosed a technique in which a graphic image or an outline image showing the entire dump truck at the bird's eye position transparently overlaps bird's eye images based on outputs of a plurality of cameras (see Patent Literature 1).

CITATION LIST

Patent Literature

Patent Literature 1: Japanese Patent Application Laid-open No. 2010-093605

SUMMARY

Technical Problem

There is a case in which the operator of the working vehicle wants to display the entire working vehicle on the bird's eye image in order to recognize the relation between the working vehicle and the object existing therearound when operating the working vehicle. At this time, when the entire working vehicle is transparently displayed on the bird's eye image from the lower side of the working vehicle, there is a possibility that the operator may not easily recognize the state of the entire working vehicle. As a result, there is a possibility that the operator (a service personnel when checking or repairing the working vehicle) may not easily recognize the relation between the working vehicle and the object existing therearound.

It is an object of the invention to provide an image which is easily understood by the operator of the working vehicle when assisting the running operation by using the bird's eye image in which the images captured by a plurality of image capturing devices are synthesized with each other.

Solution to Problem

According to the present invention, a working vehicle periphery monitoring system that monitors a periphery of a working vehicle including a vehicle body frame which supports front and rear wheels and a vessel which protrudes toward a rear side of the vehicle body frame than the rear wheels to load freight thereon, the working vehicle periphery monitoring system comprises: a plurality of image capturing devices each of which is attached to the working vehicle and captures the periphery of the working vehicle to output a piece of image information; a bird's eye image synthesizing unit that acquires a plurality pieces of the image information and synthesizes the acquired image information to generate bird's eye image information for displaying a bird's eye image of the working vehicle and the periphery of the working vehicle on a display device; and a display control unit that displays, on the display device, at least one of a first image obtained by superimposing a first vessel image including at least the vessel other than a part of the vessel at the rear side of the working vehicle on an area in which the working vehicle is present in the bird's eye image and a second image obtained by superimposing a second vessel image including at least all of the vessel on an area in which the bird's eye image is present.

In the present invention, it is preferable that the display control unit switches the display of the first image and the display of the second image based on an operation of an operator that operates the working machine.

In the present invention, it is preferable that the display control unit switches the display of the first image and the display of the second image according to a state of the working vehicle.

In the present invention, it is preferable that the display control unit switches the display of the first image and the display of the second image based on a running speed of the working vehicle.

In the present invention, it is preferable that the working vehicle includes an object detection device that detects an object existing behind the working vehicle, and the display control unit switches the display of the first image and the display of the second image when the object detection device detects the object.

In the present invention, it is preferable that the display control unit switches the display of the first image and the display of the second image when a traveling mode of the working vehicle becomes a reverse traveling mode.

According to the present invention, a working vehicle periphery monitoring system that monitors a periphery of a working vehicle including a vehicle body frame which supports front and rear wheels and a vessel which protrudes toward a rear side of the vehicle body frame than the rear wheels to load freight thereon, the working vehicle periphery monitoring system comprises: a plurality of image capturing devices each of which is attached to the working vehicle and captures the periphery of the working vehicle to output a piece of image information; a bird's eye image synthesizing unit that acquires a plurality pieces of the image information and synthesizes the acquired image information to generate bird's eye image information for displaying a bird's eye image of the working vehicle and the periphery of the working vehicle on a display device; and a display control unit that displays, on the display device, at least one of a first image obtained by superimposing a first vessel image including at least the vessel other than a part of the vessel at the rear side of the working vehicle on an area in which the working vehicle is present in the bird's eye image and a second image obtained by superimposing a second vessel image including at least all of the vessel on an area in which the bird's eye image is present, wherein the display control unit switches the display according to an operation of an operator that operates the working machine or a state of the working vehicle.

In the present invention, it is preferable that the first vessel image includes the front and rear wheels displayed on the vessel, and the second vessel image includes the front and rear wheels displayed on the vessel.

In the present invention, it is preferable that the display control unit displays all of the front and rear wheels.

In the present invention, it is preferable that as the rear wheels, a plurality of vehicle wheels are displayed at each of left and right sides of the vessel.

In the present invention, it is preferable that in the first vessel image, a rear side of the vessel than an end of the rear wheel at the rear side of the working vehicle is excluded.

According to the present invention, a working vehicle comprises: the working vehicle periphery monitoring system.

According to the invention, it is possible to provide an image which is easily understood by an operator of the working vehicle when assisting the running operation by using the bird's eye image in which the images captured by the plurality of image capturing devices are synthesized with each other.

BRIEF DESCRIPTION OF DRAWINGS

FIG. 13 is a flowchart illustrating an example of a control that switches the display of the first bird's eye image 201 and the display of the second bird's eye image 202.

DESCRIPTION OF EMBODIMENTS

Figure 1:
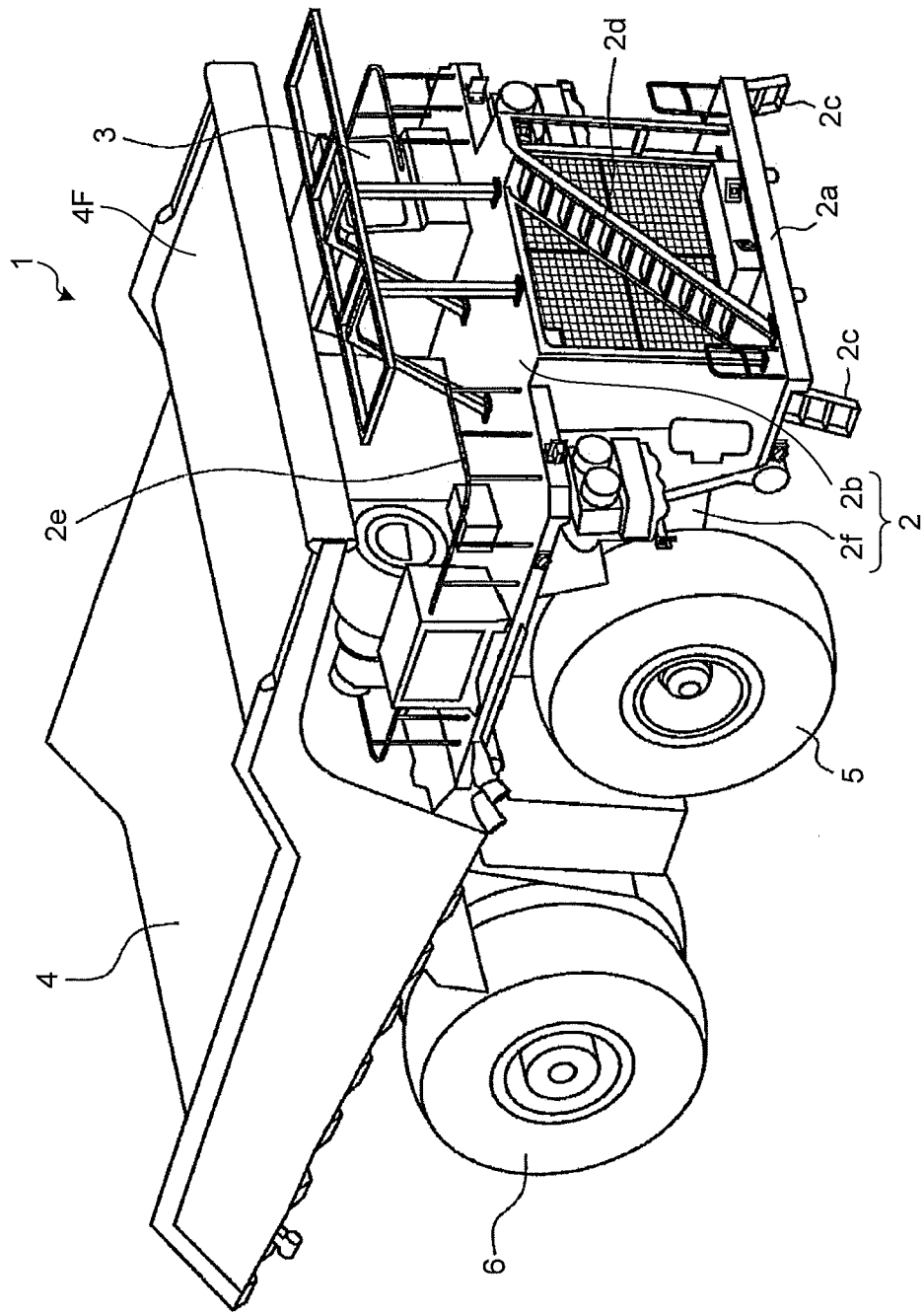
FIG. 1 is a perspective view illustrating a working vehicle according to an embodiment.

A mode for carrying out the invention (embodiment) will be described in detail by referring to the drawings. The invention is not limited to the content described in the embodiment below. In the description below, the front side, the rear side, the left side, and the right side are terms based on an operator as an operator sitting in a driver seat. For example, the front side indicates the side where the visual line of the operator sitting in the driver seat is directed and the side directed from the driver seat toward a handle operated by the operator. The rear side indicates the opposite side to the front side and the side directed from the handle toward the driver seat. The vehicle width direction of the working vehicle is identical to the left and right direction of the working vehicle.

<Working Vehicle>

Figure 2:
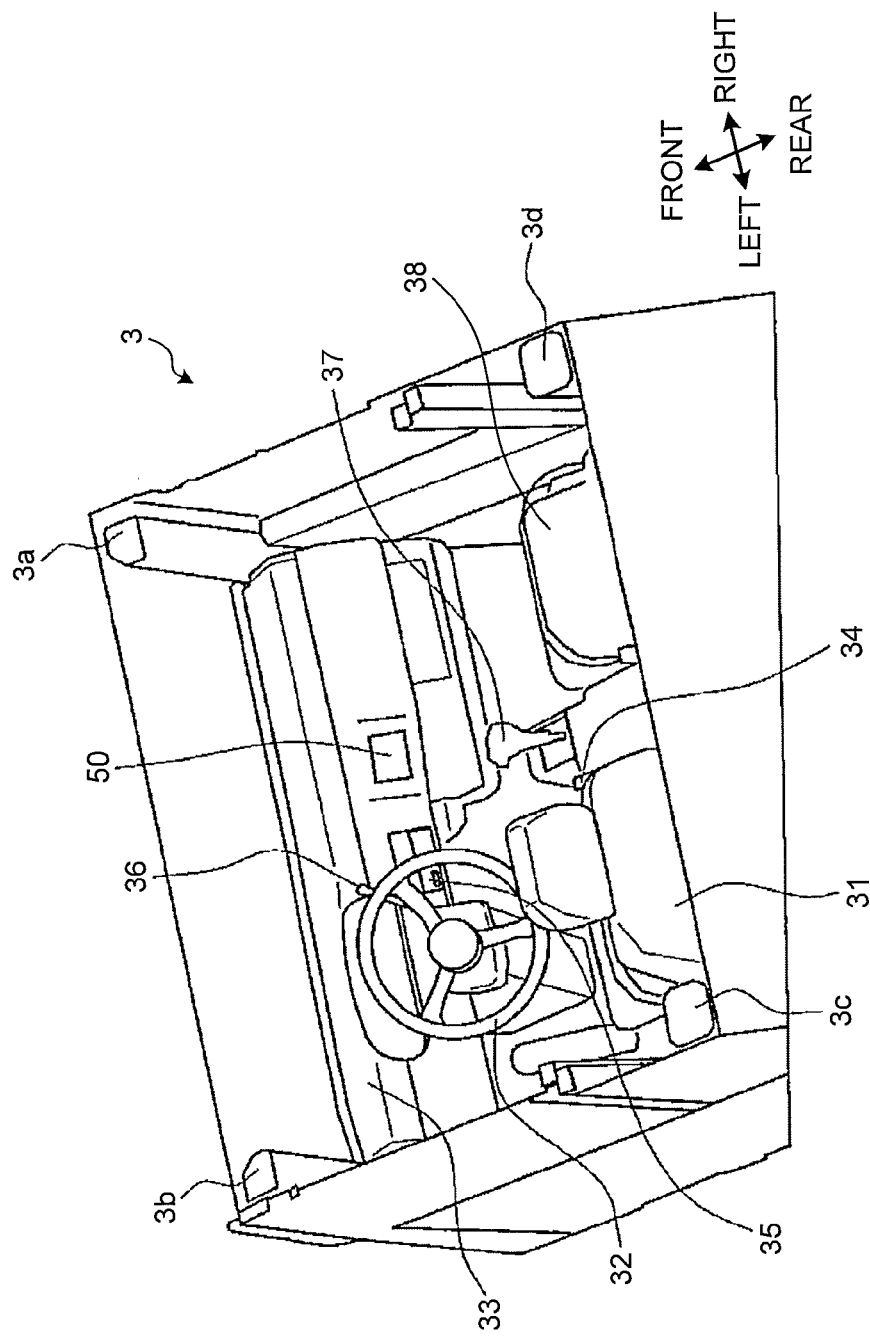
FIG. 2 is a diagram illustrating a structure and an interior of a cab 3 which is included in the working vehicle according to the embodiment.

FIG. 1 is a perspective view illustrating a working vehicle according to the embodiment. FIG. 2 is a diagram illustrating a structure and an interior of the cab 3 which is included in the working vehicle according to the embodiment. In the embodiment, a self-propelled dump truck (also called an off-highway truck) 1 as the working vehicle is a superjumbo vehicle which is used for an operation in a mine. The type of the dump truck is not limited. The dump truck 1 may be of, for example, an articulated type or the like. The dump truck 1 includes a vehicle body portion 2, the cab 3, a vessel 4, front wheels 5, and rear wheels 6. The vehicle body portion 2 includes an upper deck 2b and a frame 2f disposed along the front and rear direction. Further, the dump truck 1 includes a periphery monitoring system which monitors the periphery thereof and displays the result. The periphery monitoring system will be described in detail later.

In the embodiment, the dump truck 1 drives an electric motor by the power generated when an internal combustion engine such as a diesel engine drives a generator, so that the rear wheels 6 are driven. In this way, the dump truck 1 is of a so-called electric driving type, but the driving type of the dump truck 1 is not limited thereto. For example, the dump truck 1 may transmit the power of the internal combustion engine to the rear wheels 6 through a transmission so as to drive the rear wheels or may drive an electric motor by the power supplied through a trolley from a line so as to drive the rear wheels 6 by the electric motor.

The frame 2f supports power generating mechanisms such as the internal combustion engine and the generator and auxiliary machines thereof. The left and right front wheels 5 (only the right front wheel is illustrated in FIG. 1) are supported by the front portion of the frame 2f. The left and right rear wheels 6 (only the right rear wheel is illustrated in FIG. 1) are supported by the rear portion of the frame 2f. Each of the front wheels 5 and the rear wheels 6 has a diameter of about 2 m (meters) to 4 m (meters). As for the rear wheels 6, the inside position of the vessel 4 in the width direction or the outside position of the vessel 4 in the width direction is disposed substantially at the same position as the outside of the rear wheel 6 in the width direction. The frame 2f includes a lower deck 2a and the upper deck 2b. In this way, the dump truck 1 which is used in a mine is formed as a double deck structure with the lower deck 2a and the upper deck 2b.

The lower deck 2a is attached to the lower portion of the front surface of the frame 2f. The upper deck 2b is disposed above the lower deck 2a. A movable ladder 2c which is used to elevate the cab 3, for example, is disposed below the lower deck 2a. An inclined ladder 2d is disposed between the lower deck 2a and the upper deck 2b so that the operator moves therebetween. Further, a radiator is disposed between the lower deck 2a and the upper deck 2b. A palisade guardrail 2e is disposed on the upper deck 2b. In the embodiment, the ladder 2c and the inclined ladder 2d are set as a part of the upper deck 2b and the lower deck 2a.

As illustrated in FIG. 1, the cab (operating room) 3 is disposed on the upper deck 2b. The cab 3 is disposed on the upper deck 2b so as to be shifted to one side in the vehicle width direction in relation to the center in the vehicle width direction. Specifically, the cab 3 is disposed on the upper deck 2b so as to be positioned at the left side in the vehicle width direction in relation to the center. The arrangement of the cab 3 is not limited to the left side in relation to the center in the vehicle width direction. For example, the cab 3 may be disposed at the right side in the vehicle width direction in relation to the center, and may be disposed at the center in the vehicle width direction. Operation members such as a driver seat, a handle, a shift lever, an accelerator pedal, and a brake pedal are arranged inside the cab 3.

As illustrated in FIG. 2, the cab 3 includes a ROPS (Roll-Over Protection System) with a plurality of (in the embodiment, four) pillars 3a, 3b, 3c, and 3d. The ROPS protects the operator inside the cab 3 if the dump truck 1 rolls over. The driver of the dump truck 1 drives the dump truck in a state where a road shoulder at the left side of the vehicle body portion 2 may be easily checked, but the operator's head needs to be largely moved so as to check the periphery of the vehicle body portion 2. Further, the upper deck 2b is provided with a plurality of side mirrors (not illustrated) which are to check the periphery of the dump truck 1. Since the side mirrors are arranged at positions away from the cab 3, the driver needs to largely move his/her head even when checking the periphery of the vehicle body portion 2 using the side mirrors.

As illustrated in FIG. 2, a driver seat 31, a handle 32, a dash cover 33, a wireless device 34, a radio receiver 35, a retarder 36, a shift lever 37, a trainer seat 38, a controller (to be described later in detail) as a monitoring control device not illustrated in FIG. 2, a monitor 50, an accelerator pedal, and a brake pedal are provided inside the cab 3. The monitor 50 which is assembled in the dash cover 33 is illustrated in FIG. 2. However, the invention is not limited thereto, and for example, the monitor 50 may be provided on the dash cover 33 or may be provided so as to be suspended from the ceiling inside the cab 3. That is, the monitor 50 may be provided at a position where the operator can see the monitor 50. Furthermore, the controller not illustrated in FIG. 2 is a part of a periphery monitoring system 10 to be described later. The shift lever 37 is a device which causes the operator of the dump truck 1 to change the traveling direction of the dump truck 1 or the speed gear thereof.

The vessel 4 illustrated in FIG. 1 is a container which loads freight such as crushed stones thereon. The rear portion of the bottom surface of the vessel 4 is rotatably connected to the rear portion of the frame 2f through a rotary pin. The vessel 4 may take a loading posture and a standing posture by an actuator such as a hydraulic cylinder. As illustrated in FIG. 1, the loading posture indicates a posture in which the front portion of the vessel 4 is positioned at the upper portion of the cab 3. The standing posture indicates a posture in which the freight is discharged and the vessel 4 is inclined rearward and downward. When the front portion of the vessel 4 rotates upward, the vessel 4 changes from the loading posture to the standing posture. The vessel 4 includes a flange portion 4F formed at the front portion thereof. The flange portion 4F is called a protector and extends to the upper side of the cab 3 so as to cover the cab 3. The flange portion 4F which extends to the upper side of the cab 3 protects the cab 3 from the collision with crushed stones and the like.

<Periphery Monitoring System>

Figure 3:
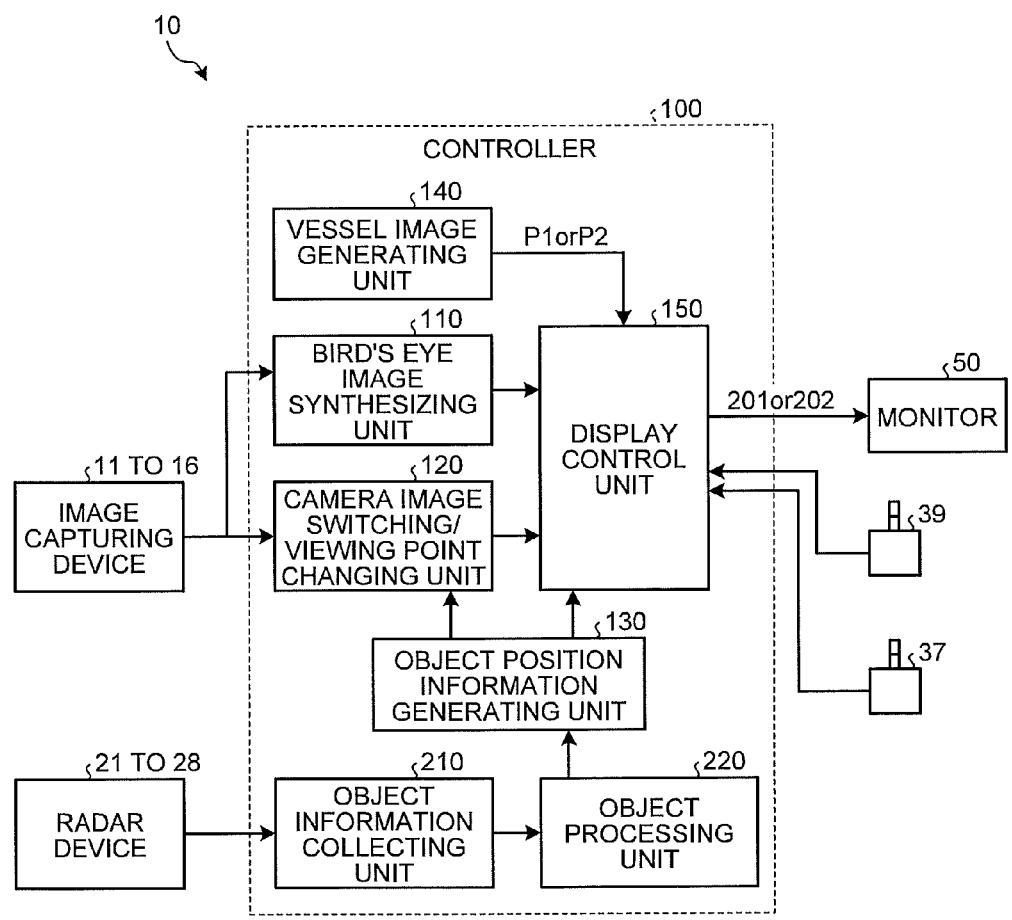
FIG. 3 is a diagram illustrating a periphery monitoring system 10 according to the embodiment.
Figure 4:
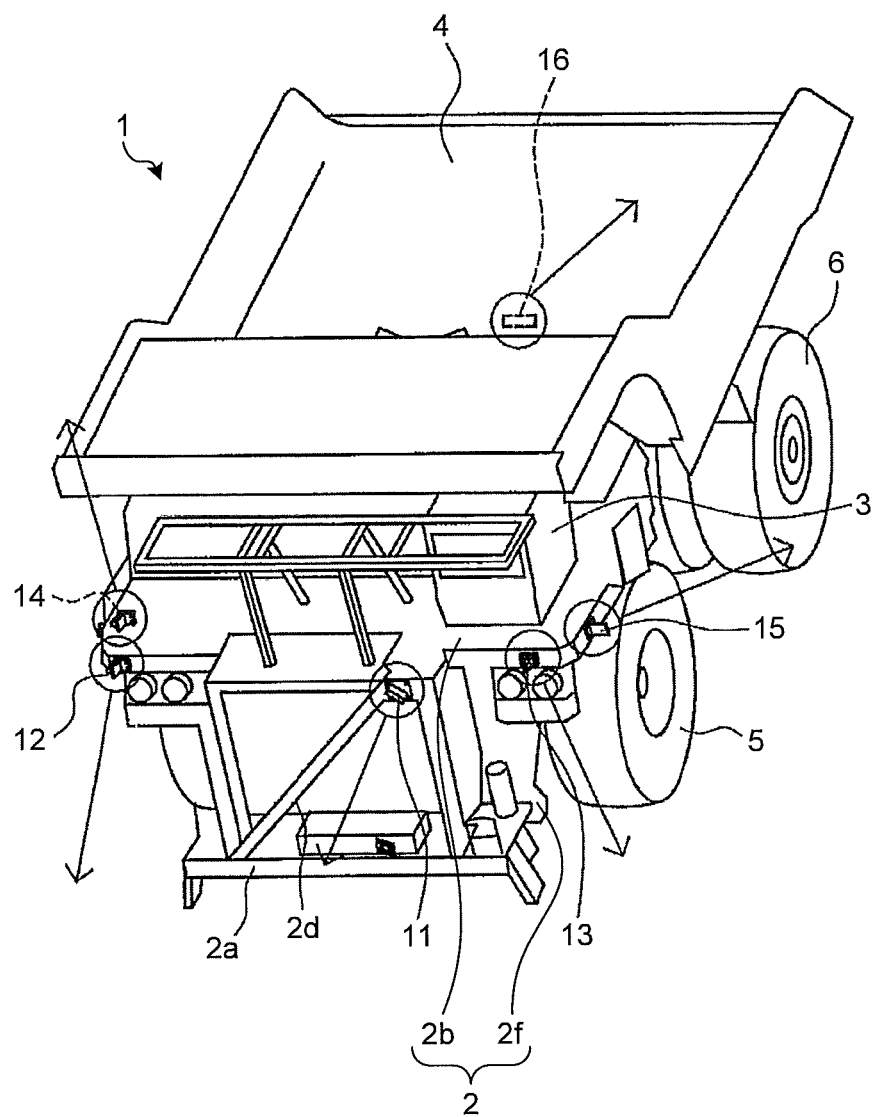
FIG. 4 is a perspective view of a dump truck 1 equipped with image capturing devices 11 to 16 which are included in the periphery monitoring system 10 according to the embodiment.
Figure 5:
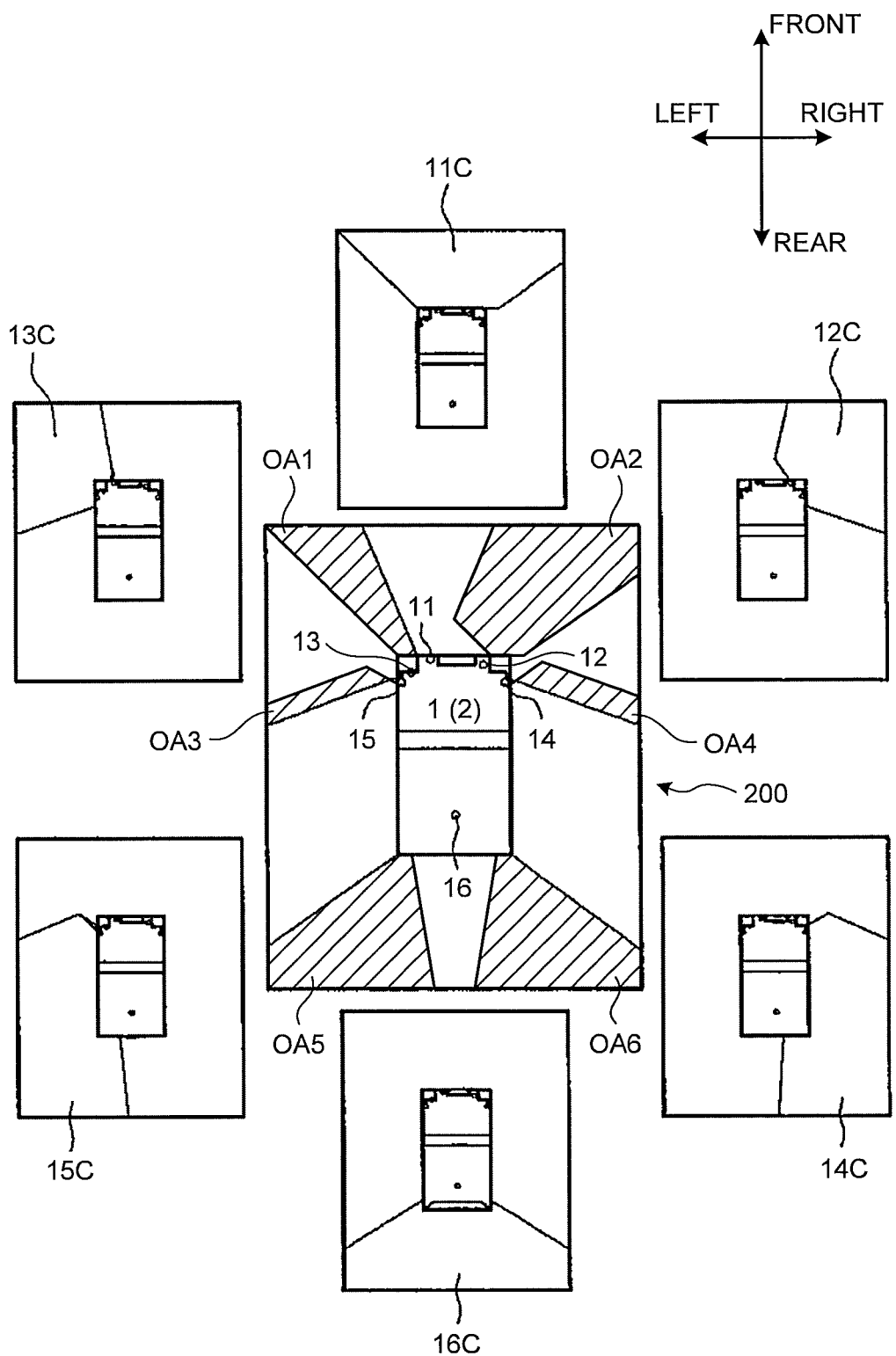
FIG. 5 is a schematic diagram illustrating areas which are captured by a plurality of image capturing devices 11 to 16 and a bird's eye image 200 which is generated based on the information of images captured by the plurality of image capturing devices 11 to 16.

FIG. 3 is a diagram illustrating the periphery monitoring system 10 according to the embodiment. FIG. 4 is a perspective view of the dump truck 1 equipped with image capturing devices 11 to 16 which are included in the periphery monitoring system 10 according to the embodiment. FIG. 5 is a schematic diagram illustrating areas which are captured by a plurality of image capturing devices 11 to 16 and a bird's eye image 200 which is generated based on the information of the images captured by the plurality of image capturing devices 11 to 16. The areas which are captured by the plurality of image capturing devices illustrated in FIG. 5 are areas taking the ground surface as reference. As illustrated in FIG. 3, the periphery monitoring system 10 includes a plurality of (in the embodiment, six) image capturing devices 11, 12, 13, 14, 15, and 16, a plurality of (in the embodiment, eight) radar devices 21, 22, 23, 24, 25, 26, 27, and 28, the monitor 50, and a controller 100 as a monitoring control device. Furthermore, in the embodiment, the periphery monitoring system 10 may not be essentially provided with the radar devices 21, 22, 23, 24, 25, 26, 27, and 28.

<Image Capturing Device>

The image capturing devices 11, 12, 13, 14, 15, and 16 are attached to the dump truck 1. The image capturing devices 11, 12, 13, 14, 15, and 16 are, for example, wide dynamic range (WDR) cameras. The wide dynamic range camera is a camera that has a function of brightly correcting a dark portion while maintaining a bright portion at a visible level and adjusting the entire portion so as to be visible.

The image capturing devices 11, 12, 13, 14, 15, and 16 capture the periphery of the dump truck 1 and output the result as an image information. In the description below, the image capturing device 11 is appropriately referred to as a first image capturing device 11, the image capturing device 12 is appropriately referred to as a second image capturing device 12, the image capturing device 13 is appropriately referred to as a third image capturing device 13, the image capturing device 14 is appropriately referred to as a fourth image capturing device 14, the image capturing device 15 is appropriately referred to as a fifth image capturing device 15, and the image capturing device 16 is appropriately referred to as a sixth image capturing device 16. Further, when there is no need to distinguish these image capturing devices, these image capturing devices are appropriately referred to as the image capturing devices 11 to 16.

As illustrated in FIG. 4, six image capturing devices 11 to 16 are respectively attached to the outer peripheral portion of the dump truck 1 so as to capture the images in the periphery of the dump truck 1 by 360°. In the embodiment, each of the image capturing devices 11 to 16 has a viewing range of 120° (60° at each of the left and right sides) in the left and right direction and 96° in the height direction, but the viewing range is not limited thereto. Further, the respective image capturing devices 11 to 16 are indicated by the arrows in FIG. 4, and the directions indicated by the arrows indicate the directions in which the respective image capturing devices 11 to 16 face.

As illustrated in FIG. 4, the first image capturing device 11 is attached to the front surface of the dump truck 1. Specifically, the first image capturing device 11 is disposed at the upper end of the inclined ladder 2d, and more specifically, the lower side of the landing portion of the uppermost stage. The first image capturing device 11 is fixed through the bracket which is attached to the upper deck 2b so as to face the front side of the dump truck 1. As illustrated in FIG. 5, the first image capturing device 11 captures a first area 11C in the area existing in the periphery of the dump truck 1 and outputs a first image information as an image information. The first area 11C is an area which is extended toward the front side of the vehicle body portion 2 of the dump truck 1.

As illustrated in FIG. 4, the second image capturing device 12 is attached to one side portion of the front surface of the dump truck 1. Specifically, the second image capturing device 12 is disposed at the right portion of the front surface of the upper deck 2b. The second image capturing device 12 is fixed through the bracket attached to the upper deck 2b so as to face the diagonally forward right side of the dump truck 1. As illustrated in FIG. 5, the second image capturing device 12 captures a second area 12C in the area existing in the periphery of the dump truck 1 and outputs a second image information as an image information. The second area 12C is an area which is extended toward the diagonally forward right side of the vehicle body portion 2 of the dump truck 1.

As illustrated in FIG. 4, the third image capturing device 13 is attached to the other side of the front surface of the dump truck 1. Specifically, the third image capturing device 13 is disposed at the left portion of the front surface of the upper deck 2b. Then, the third image capturing device 13 is disposed so as to be bilaterally symmetric to the second image capturing device 12 about the axis passing the center of the dump truck 1 in the vehicle width direction. The third image capturing device 13 is fixed through the bracket attached to the upper deck 2b so as to face the diagonally forward left side of the dump truck 1. As illustrated in FIG. 5, the third image capturing device 13 captures a third area 13C in the area existing in the periphery of the dump truck 1 and outputs a third image information as an image information. The third area 13C is an area which is extended toward the diagonally forward left side of the vehicle body portion 2 of the dump truck 1.

As illustrated in FIG. 4, the fourth image capturing device 14 is attached to one side surface of the dump truck 1. Specifically, the fourth image capturing device 14 is disposed at the front portion of the right side surface of the upper deck 2b. The fourth image capturing device 14 is fixed through the bracket attached to the upper deck 2b so as to face the diagonally backward right side of the dump truck 1. As illustrated in FIG. 5, the fourth image capturing device 14 captures a fourth area 14C in the area existing in the periphery of the dump truck 1 and outputs a fourth image information as an image information. The fourth area 14C is an area which is extended toward the diagonally backward right side of the vehicle body portion 2 of the dump truck 1.

As illustrated in FIG. 4, the fifth image capturing device 15 is attached to the other side surface of the dump truck 1. Specifically, the fifth image capturing device 15 is disposed at the front portion of the left side surface of the upper deck 2b. Then, the fifth image capturing device 15 is disposed so as to be bilaterally symmetric to the fourth image capturing device 14 about the axis passing the center of the dump truck 1 in the vehicle width direction. As illustrated in FIG. 5, the fifth image capturing device 15 captures a fifth area 15C in the area existing in the periphery of the dump truck 1 and outputs a fifth image information as an image information. The fifth area 15C is an area which is extended toward the diagonally backward left side of the vehicle body portion 2 of the dump truck 1.

As illustrated in FIG. 4, the sixth image capturing device 16 is attached to the rear portion of the dump truck 1. Specifically, the sixth image capturing device 16 is disposed above an axle housing connecting two rear wheels 6 and 6 at the rear end of the frame 2f and near the rotary shaft of the vessel 4. The sixth image capturing device 16 is fixed toward the rear side of the dump truck 1 through the bracket which is attached to a crossbar connecting the left and right frames 2f. As illustrated in FIG. 5, the sixth image capturing device 16 captures a sixth area 16C in the area existing in the periphery of the dump truck 1 and outputs a sixth image information as an image information. The sixth area 16C is an area which is extended toward the rear side of the vehicle body portion 2 of the dump truck 1.

By using the above-described six image capturing devices 11 to 16, the periphery monitoring system 10 according to the embodiment may capture the images in the entire circumference of the dump truck 1 by 360° and acquire the image information as illustrated in FIG. 5. Six image capturing devices 11 to 16 transmit the first image information to the sixth image information as the respectively captured image information to the controller 100 illustrated in FIG. 3.

The first image capturing device 11, the second image capturing device 12, the third image capturing device 13, the fourth image capturing device 14, and the fifth image capturing device 15 are provided in the upper deck 2b which exists at the relatively high position. For this reason, the controller 100 may obtain an image which is seen from the bird's eye position toward the ground surface by the first image capturing device 11 to the fifth image capturing device 15 and hence may capture an object such as a vehicle existing on the ground surface in a broad range. Further, even when the viewing point is changed upon causing the controller 100 to generate the bird's eye image 200 illustrated in FIG. 5 from the first image information to the sixth image information acquired by the first image capturing device 11 to the sixth image capturing device 16, the deformation degree of the three-dimensional object is suppressed since the first image information to the fifth image information in the first image information to the sixth image information are information items captured from the bird's eye position.

<Radar Device>

Figure 6:
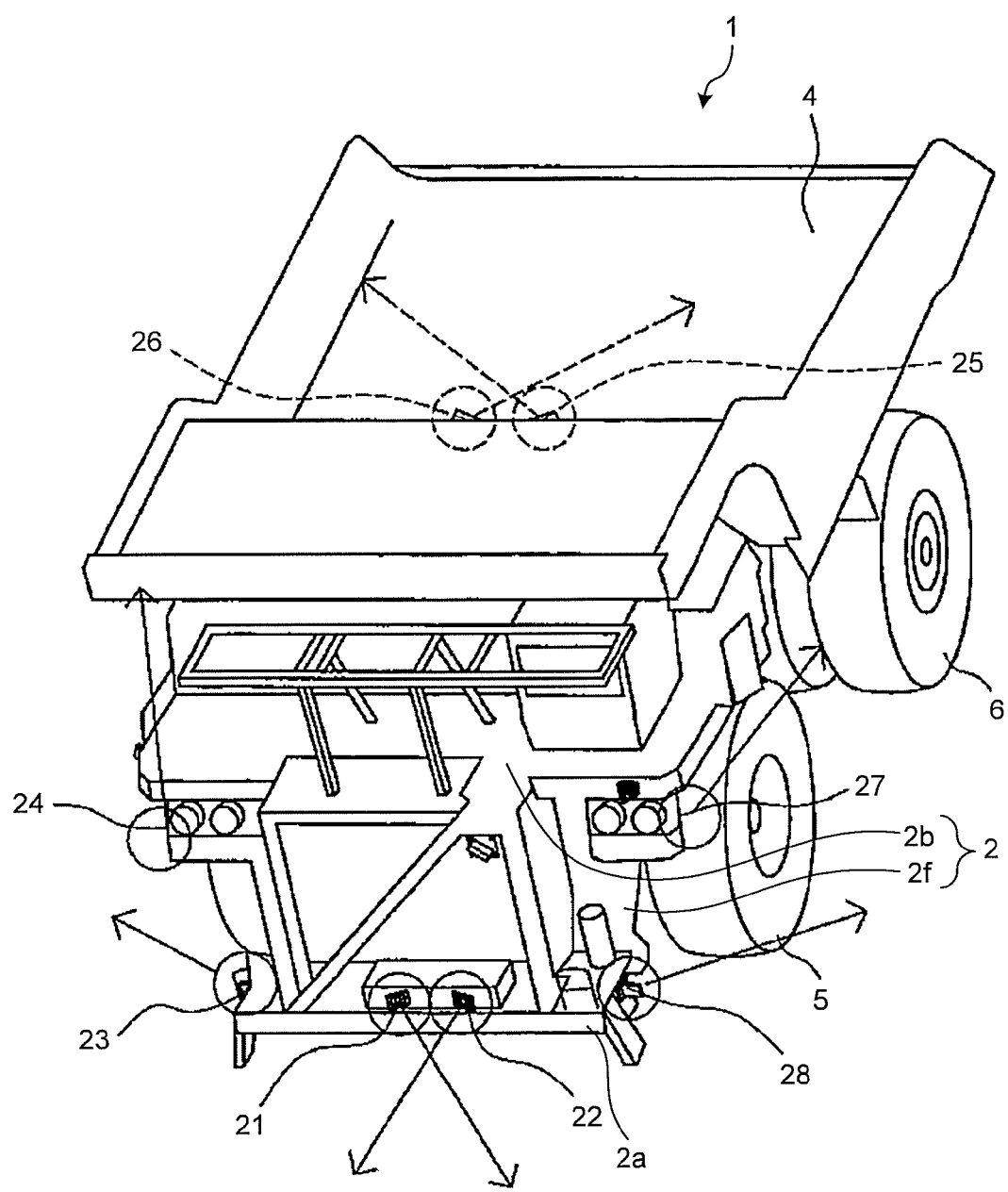
FIG. 6 is a perspective view illustrating an arrangement of radar devices 21 to 26.

FIG. 6 is a perspective view illustrating an arrangement of the radar devices 21 to 28. In the embodiment, each of the radar devices 21, 22, 23, 24, 25, 26, 27, and 28 (hereinafter, referred to as appropriate radar devices 21 to 28) as the object detecting device is a ultra wide band (UWB) radar which has, for example, the orientation of 80° (40° in the left and right directions) and a maximum detection distance of 15 m or more. The radar devices 21 to 28 detect a position (relative position) of the object existing in the periphery of the dump truck 1 relative to the dump truck 1. The respective radar devices 21 to 28 are attached to the outer peripheral portion of the dump truck 1 as in the image capturing devices 11 to 16. Further, the respective radar devices 21 to 28 are indicated by the arrows in FIG. 6, and the direction indicated by the arrows indicate the directions of the detection ranges of the respective radar devices 21 to 28.

As illustrated in FIG. 6, the radar device 21 (which is appropriately referred to as the first radar device 21) is disposed at the front surface of the vehicle body portion 2 in the lower deck 2a disposed at the height of about 1 m from the ground surface and the slightly right side in relation to the center of the vehicle body portion 2 in the vehicle width direction. The detection range of the first radar device 21 becomes a range which is extended toward the diagonally forward left side from the front side of the vehicle body portion 2 of the dump truck 1.

As illustrated in FIG. 6, the radar device 22 (which is appropriately referred to as the second radar device 22) is disposed at the front surface of the vehicle body portion 2 in the lower deck 2a and the slightly left side in relation to the center of the vehicle body portion 2 in the vehicle width direction. That is, the second radar device 22 is disposed at the left side of the first radar device 21 so as to be adjacent to the first radar device 21. The detection range of the second radar device 22 becomes a range which is extended toward the diagonally forward right side from the front side of the vehicle body portion 2 of the dump truck 1.

As illustrated in FIG. 6, the radar device 23 (which is appropriately referred to as the third radar device 23) is disposed near the front end of the right side surface of the lower deck 2a. The detection range of the third radar device 23 becomes a range which is extended rightward from the diagonally forward right side of the vehicle body portion 2 of the dump truck 1.

As illustrated in FIG. 6, the radar device 24 (which is appropriately referred to as the fourth radar device 24) is disposed near the right end at the middle height position between the lower deck 2a and the upper deck 2b at the side portion of the vehicle body portion 2. The detection range of the fourth radar device 24 becomes a range which is extended backward from the right side of the vehicle body portion 2 of the dump truck 1.

As illustrated in FIG. 6, the radar device 25 (which is appropriately referred to as the fifth radar device 25) is disposed above the axle that transmits the driving force to the left and right rear wheels 6 of the dump truck 1 below the vessel 4. The detection range of the fifth radar device 25 becomes a range which is extended backward from the diagonally backward right side of the vehicle body portion 2 of the dump truck 1.

As illustrated in FIG. 6, the radar device 26 (which is appropriately referred to as the sixth radar device 26) is disposed near the right side of the fifth radar device 25 above the axle as in the fifth radar device 25. The detection range of the sixth radar device 26 becomes a range which is extended backward from the diagonally backward left side of the vehicle body portion 2 of the dump truck 1 so as to intersect the detection range of the fifth radar device 25.

As illustrated in FIG. 6, the radar device 27 (which is appropriately referred to as the seventh radar device 27) is disposed near the left end at the middle height position between the lower deck 2a and the upper deck 2b at the side surface of the vehicle body portion 2. That is, the radar device is disposed so as to be bilaterally symmetric to the fourth radar device 24 about the center axis of the vehicle body portion 2 in the vehicle width direction. The detection range of the seventh radar device 27 becomes a range which is extended backward from the left side of the vehicle body portion 2 of the dump truck 1.

As illustrated in FIG. 6, the radar device 28 (which is appropriately referred to as the eighth radar device 28) is disposed near the front end of the left side surface of the lower deck 2a. That is, the radar device is disposed so as to be bilaterally symmetric to the third radar device 23 about the center axis of the vehicle body portion 2 in the vehicle width direction. The detection range of the eighth radar device 28 becomes a range which is extended leftward from the diagonally forward left side of the vehicle body portion 2 of the dump truck 1.

Eight radar devices 21 to 28 may detect the relative position between the dump truck 1 and objects in the detection range in the entire periphery of 360° of the dump truck 1. Eight radar devices 21 to 28 transmit the relative position information representing the relative position between the respectively detected objects and the dump truck 1 to the controller 100. In this way, the plurality of (eight) radar devices 21 to 28 are provided in the vehicle body portion 2 so as to detect the object existing in the entire periphery of the vehicle body portion 2.

<Controller>

The controller 100 illustrated in FIG. 3 displays the existence of the object in the periphery of the dump truck 1 as the bird's eye image 200 captured by the image capturing devices 11 to 16 and the radar devices 21 to 28 and notifies the existence of the object to the operator, if necessary. As illustrated in FIG. 3, the controller 100 includes a bird's eye image synthesizing unit 110, a camera image switching/viewing point changing unit 120, an object position information generating unit 130, a display control unit 150, a vessel image generating unit 140, an object information collecting unit 210, and an object processing unit 220.

The bird's eye image synthesizing unit 110 is connected to the image capturing devices 11 to 16 as illustrated in FIG. 3. The bird's eye image synthesizing unit 110 receives a plurality of image information (the first image information to the sixth image information) which are respectively generated by the capturing of the respective image capturing devices 11 to 16. Then, the bird's eye image synthesizing unit 110 synthesizes the images corresponding to the received plurality of image information and generates the bird's eye image 200 including the entire periphery of the dump truck 1. Specifically, the bird's eye image synthesizing unit 110 generates the bird's eye image information for displaying the bird's eye image 200, obtained by projecting a plurality of images onto a predetermined projection plane, on the monitor 50 by respectively changing the coordinates of the plurality of image information. The bird's eye image information will be described later.

As illustrated in FIG. 3, the camera image switching/viewing point changing unit 120 is connected to the image capturing devices 11 to 16. Then, the camera image switching/viewing point changing unit 120 switches the bird's eye image 200 and the images captured by the respective image capturing devices 11 to 16 and displayed on the screen of the monitor 50 in response to, for example, the obstacle detection result by the radar devices 21 to 28. Further, the camera image switching/viewing point changing unit 120 changes the image information acquired by the respective image capturing devices 11 to 16 to the image information from the viewing point of the upward infinity.

As illustrated in FIG. 3, the object position information generating unit 130 is connected to the camera image switching/viewing point changing unit 120, the display control unit 150, and the object processing unit 220. The object position information generating unit 130 generates the object position information for synthesizing and displaying the object position information acquired by the radar devices 21 to 28 in the bird's eye image 200 which is formed by synthesizing the image information acquired by the respective image capturing devices 11 to 16 and transmits the result to the camera image switching/viewing point changing unit 120 and the display control unit 150.

As illustrated in FIG. 3, the vessel image generating unit 140 is connected to the display control unit 150. The vessel image generating unit 140 generates information (first information P1) for displaying a first vessel image showing the vessel 4 by partially excluding the rear side of the vessel 4 on the monitor 50 and information (second information P2) for displaying a second vessel image showing the entire vessel 4 on the monitor 50 in the image of the vessel 4 of the dump truck 1 illustrated in FIGS. 1 and 4. Then, the vessel image generating unit 140 transmits at least one of the generated first and second vessel images to the display control unit 150. The first vessel image and the second vessel image may display the front wheels 5 and the rear wheels 6 of the dump truck 1 illustrated in FIG. 1. The first vessel image and the second vessel image will be described later.

As illustrated in FIG. 3, the display control unit 150 is connected to the bird's eye image synthesizing unit 110, the camera image switching/viewing point changing unit 120, the object position information generating unit 130, and the vessel image generating unit 140. The display control unit 150 generates the bird's eye image 200 including the position of the object based on the object position information in the entire periphery of the dump truck 1 obtained by the radar devices 21 to 28 and the bird's eye image information in the entire periphery of the dump truck 1 generated by the bird's eye image synthesizing unit 110. The image is displayed on the monitor 50.

Further, the display control unit 150 acquires at least one of the first vessel image and the second vessel image generated by the vessel image generating unit 140. Then, the display control unit 150 generates at least one of a first bird's eye image 201 obtained by superimposing the first vessel image on the portion of the dump truck 1 of the bird's eye image 200 and a second bird's eye image 202 obtained by superimposing the second vessel image on the portion of the dump truck 1 of the bird's eye image 200. The display control unit 150 displays any one of the generated first and second bird's eye images 201 and 202 on the monitor 50. The display control unit 150 may switch the display of the first bird's eye image 201 and the display of the second bird's eye image 202 on the monitor 50. The first bird's eye image 201 and the second bird's eye image 202 will be described later.

As illustrated in FIG. 3, the display control unit 150 is connected with the shift lever 37 and an image switching switch 39. The display control unit 150 receives a signal transmitted from the shift lever 37 and the image switching switch 39. For example, when the shift lever 37 is changed to a reverse traveling mode, that is, the traveling mode of the dump truck 1 is changed to the reverse traveling mode, the display control unit 150 switches, for example, the image displayed on the monitor 50 to only the image (the image which captures the sixth area 16C (FIG. 5) as the area extended toward the rear side of the vehicle body portion 2) captured by the sixth image capturing device 16. That is, when the shift lever 37 is present at the neutral mode or the forward traveling mode, the first bird's eye image or the second bird's eye image and the image captured by any one of the image capturing devices 11 to 16 are displayed in parallel on the monitor 50. However, in order to show the rear image of the dump truck 1 to the operator in the reverse traveling mode, a single image is displayed on the monitor 50 when the shift lever 37 is changed to the reverse traveling mode. Furthermore, when the shift lever 37 is present at the neutral mode or the forward traveling mode, only the bird's eye image may be displayed on the monitor 50 and only any image may be displayed from the images captured by the image capturing devices 11 to 16. Alternatively, the monitor 50 may display any two images in parallel from the bird's eye images and the images captured by the image capturing devices 11 to 16. The display on the monitor 50 may be switched in a manner such that the operator operates a switch (not illustrated). The switch is connected to the display control unit 150.

Further, for example, when the image switching switch 39 is operated by an operator (a service personnel instead of the operator when checking or repairing a working vehicle) as an operator of the dump truck 1 so as to display the first bird's eye image 201, the display control unit 150 switches the image displayed on the monitor 50 to the first bird's eye image 201. The image switching switch 39 is a push button type switch, and may be provided near the monitor 50 or the driver seat 31. It is desirable that the installation position of the image switching switch 39 be a position where the switch is easily touched by the operator's hand. Further, the monitor 50 may be a touch panel, and the image switching switch 39 may be operated by the contact of a finger on the touch panel.

As illustrated in FIG. 3, the object information collecting unit 210 is connected to the radar devices 21 to 28 and the object processing unit 220. The object information collecting unit 210 receives the object detection result in the respective detection ranges of the radar devices 21 to 28 and transmits the object detection result to the object processing unit 220.

As illustrated in FIG. 3, the object processing unit 220 is connected to the object information collecting unit 210 and the object position information generating unit 130. The object processing unit 220 transmits the object position information received from the object information collecting unit 210 to the object position information generating unit 130.

The controller 100 is configured by a combination of, for example, a computer including a CPU (Central Processing Unit) as a calculation device and a memory as a storage device and an image processing device (for example, an image board) executing an image process such as a synthesis of the bird's eye image. The image processing device is equipped with, for example, an exclusive IC (for example, FPGA: Field-Programmable Gate Array) executing an image process such as a synthesis of the bird's eye image, a memory (for example, VRAM: Video Random Access Memory), and the like.

In the embodiment, as illustrated in FIG. 4, the image capturing devices 11 to 16 are disposed at the front surface and the side surface of the upper deck 2b and below the vessel 4. Then, the controller 100 generates the bird's eye image 200 illustrated in FIG. 5 by synthesizing the first image information to the sixth image information captured and acquired by the image capturing devices 11 to 16 and displays the result on the monitor 50 which is disposed at the front side of the driver seat 31 inside the cab 3. At this time, the monitor 50 displays an image such as the bird's eye image 200 in response to the control of the controller 100. The bird's eye image 200 may be obtained by the controller 100 through the synthesizing of the first image information to the sixth image information corresponding to the first area 11C to the sixth area 16C captured by the image capturing devices 11 to 16. The periphery monitoring system 10 displays the bird's eye image 200 on the monitor 50. For this reason, the operator of the dump truck 1 may monitor the entire range of 360° in the periphery of the dump truck 1 by seeing the bird's eye image 200 displayed on the monitor 50.

Next, the bird's eye image will be described.

<Generation of Bird's Eye Image>

Figure 7:
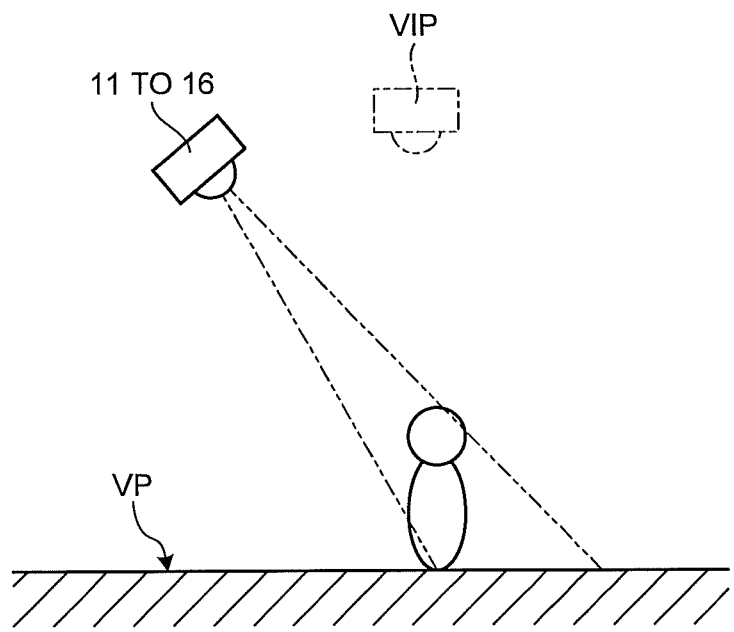
FIG. 7 is a diagram illustrating an image switching method using a virtual projection plane VP.

FIG. 7 is a diagram illustrating an image switching method using a virtual projection plane VP. The controller 100 generates the bird's eye image 200 in the periphery of the dump truck 1 based on the plurality of images obtained by the first image information to the sixth image. Specifically, the controller 100 executes the coordinate conversion of the first image information to the sixth image information using the predetermined conversion information item. The conversion information is the information which represents the position coordinate of each pixel of the input image and the position coordinate of each pixel of the output image. In the embodiment, the input image is an image which is captured by the image capturing devices 11 to 16 and corresponds to the first image information to the sixth image information. The output image is the bird's eye image 200 which is displayed on the monitor 50.

The controller 100 converts the images captured by the image capturing devices 11 to 16 into the image seen from a predetermined virtual viewing point positioned above the dump truck 1 by using the conversion information. Specifically, as illustrated in FIG. 7, the images captured by the image capturing devices 11 to 16 are projected onto a predetermined virtual projection plane VP, so that the images are converted into the image seen from the virtual viewing point VIP positioned above the dump truck 1. The conversion information represents the virtual projection plane VP. The converted image is the bird's eye image displayed on the monitor 50. The controller 100 generates the bird's eye image 200 in the periphery of the dump truck 1 by projecting the first image information to the sixth image information acquired from the plurality of image capturing devices 11 to 16 onto the predetermined virtual projection plane VP so as to synthesize the image information.

As illustrated in FIG. 5, the areas in the periphery of the dump truck 1 captured by the respective image capturing devices 11 to 16 overlap each other in the first overlapping area OA1 to the sixth overlapping area OA6. The controller 100 displays, in the bird's eye image 200, the images corresponding to the first image information to the sixth image information from the image capturing devices 11 to 16 in the first overlapping area OA1 to the sixth overlapping area OA6 are disposed so that two adjacent images overlap each other.

Specifically, the controller 100 displays the image of the first image information from the first image capturing device 11 and the image of the third image information from the third image capturing device 13 in the first overlapping area OA1 so as to overlap each other. Further, the controller 100 displays the image of the first image information from the first image capturing device 11 and the image of the second image information from the second image capturing device 12 in the second overlapping area OA2 so as to overlap each other. Further, the controller 100 displays the image of the third image information from the third image capturing device 13 and the image of the fifth image information from the fifth image capturing device 15 in the third overlapping area OA3 so as to overlap each other. Further, the controller 100 displays the image of the second image information from the second image capturing device 12 and the image of the fourth image information from the fourth image capturing device 14 in the fourth overlapping area OA4 so as to overlap each other. Further, the controller 100 displays the image of the fifth image information from the fifth image capturing device 15 and the image of the sixth image information from the sixth image capturing device 16 in the fifth overlapping area OA5 so as to overlap each other. Further, the controller 100 displays the image of the fourth image information from the fourth image capturing device 14 and the image of the sixth image information from the sixth image capturing device 16 in the sixth overlapping area OA6 so as to overlap each other.

In this way, in a case where two image information are synthesized so as to overlap each other in the first overlapping area OA1 to the sixth overlapping area OA6, a value obtained by multiplying the synthesis ratio is added to the value of the first image information to the sixth image information. The synthesis ratio is a value corresponding to each of the first image information to the sixth image information, and is stored in the controller 100. For example, the synthesis ratio of the first image information is 0.5, and the synthesis ratio of the second image information is 0.5. In this way, the synthesis ratio is set for each of the first image information to the sixth image. Since the synthesis ratio is used, the plurality of image information is displayed in a manner that the first overlapping area OA1 to the sixth overlapping area OA6 are averaged. As a result, abrupt changes in the color and the contrast are suppressed, and hence the controller 100 may generate the natural bird's eye image 200. The controller 100 generates the synthesis image information for displaying the bird's eye image 200 synthesized as described above, and outputs the synthesis image information to the monitor 50.

<Image Capturing Ranges of Respective Image Capturing Devices>

As illustrated in FIG. 2, in the dump truck 1, the first image capturing device 11, the second image capturing device 12, the third image capturing device 13, the fourth image capturing device 14, and the fifth image capturing device 15 are disposed in the upper deck 2b, and the sixth image capturing device 16 is disposed below the vessel 4 at the rear end of the frame 2f. In particular, the second image capturing device 12 and the third image capturing device 13 cover the area from the diagonally forward left and right sides of the vehicle body portion 2 of the dump truck 1 to the left and right sides as the image capturing area. Further, the fourth image capturing device 14 and the fifth image capturing device 15 cover the area from the left and right sides of the vehicle body portion 2 of the dump truck 1 to the diagonally backward left and right sides as the image capturing area. With such a configuration, the controller 100 synthesizes the first image information and the sixth image information captured by the first image capturing device 11 and the sixth image capturing device 16, and generates the bird's eye image 200 covering the entire periphery of the dump truck 1, thereby monitoring the periphery of the dump truck 1.

Further, in the embodiment, as illustrated in FIG. 5, the adjacent image capturing devices 11 to 16 are disposed so that the first area 11C to the sixth area 16C as the areas which may be captured by the image capturing devices 11 to 16 overlap each other at the adjacent portions. The controller 100 may monitor the entire periphery of 360° on the plane of the dump truck 1 by providing the connection line at the overlapping portions of the first area 11C to the sixth area 16C which may be captured by the respective image capturing devices 11 to 16. Furthermore, in the bird's eye image 200, the connection line connecting the first area 11C to the sixth area 16C adjacent to each other may be set to an arbitrary position in the overlapping range of the first area 11C to the sixth area 16C.

<Image Displayed on Monitor>

The image which is displayed on the monitor 50 illustrated in FIGS. 2 and 3 is the first bird's eye image 201 or the second bird's eye image 202 described above. The first bird's eye image 201 or the second bird's eye image 202 is generated by the controller 100 illustrated in FIG. 3. More specifically, the first bird's eye image or the second bird's eye image is generated by combining the above-described first vessel image and second vessel image with the bird's eye image 200 based on the bird's eye image information which is obtained by synthesizing the first image information to the sixth image information using the bird's eye image synthesizing unit 110. Here, the bird's eye image information is described, and the first vessel image, the second vessel image, the first bird's eye image 201, and the second bird's eye image 202 are described.

Figure 8:
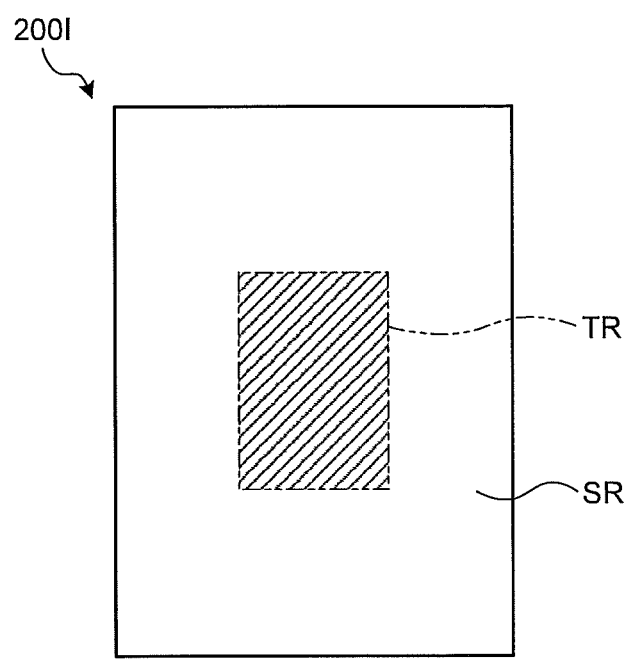
FIG. 8 is a conceptual diagram illustrating a bird's eye image information 200I.

FIG. 8 is a conceptual diagram illustrating a bird's eye image information 200I. The bird's eye image information 200I illustrated in FIG. 8 includes the information of the working vehicle area TR as the area with the dump truck 1 and the information of the periphery area SR as the periphery area of the dump truck 1. As described above, the bird's eye image information 200I is generated from the image information captured by the image capturing devices 11 to 16, that is, the first image information to the sixth image information. Since the image capturing devices 11 to 16 are attached to the outside of the dump truck 1, the area at the inside in relation to the lenses of the image capturing devices 11 to 16 is not captured. For this reason, the working vehicle area TR of the bird's eye image information 200I does not include the image information of the dump truck 1 and the image information of the periphery area SR. Accordingly, for example, when the image based on the bird's eye image information 200I is displayed on the monitor 50, the portion of the working vehicle area TR of the displayed image is displayed as, for example, a shadow.

In a case where the bird's eye image 200 is displayed on the monitor 50, for example, the controller 100 displays the bird's eye image 200 on the monitor based on the image information obtained by combining the image information (where the information format is, for example, a bitmap format) illustrating the top view of the dump truck 1 with the working vehicle area TR of the bird's eye image information 200I. The bird's eye image 200 illustrated in FIG. 5 is obtained by displaying the image information generated in this way is displayed on the monitor 50. Next, the first vessel image and the second vessel image will be described.

Figure 9:
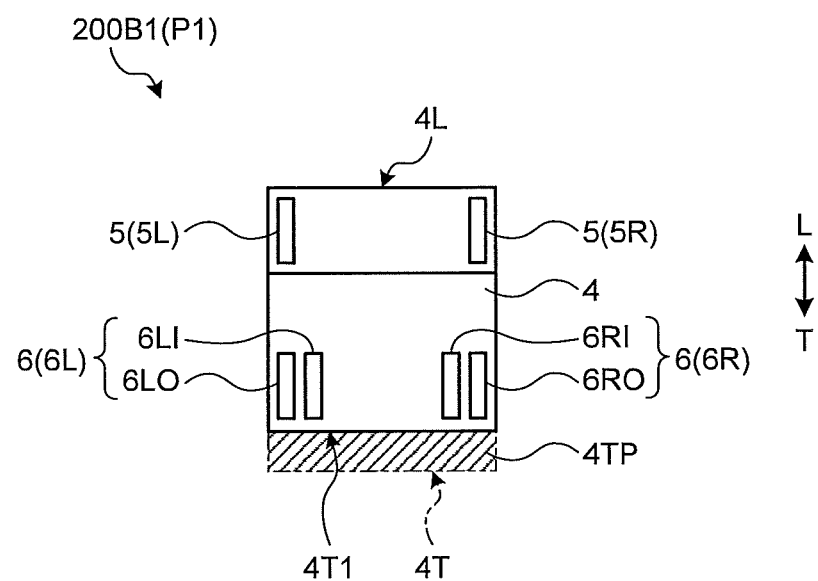
FIG. 9 is a diagram illustrating a first vessel image 200B1.
Figure 10:
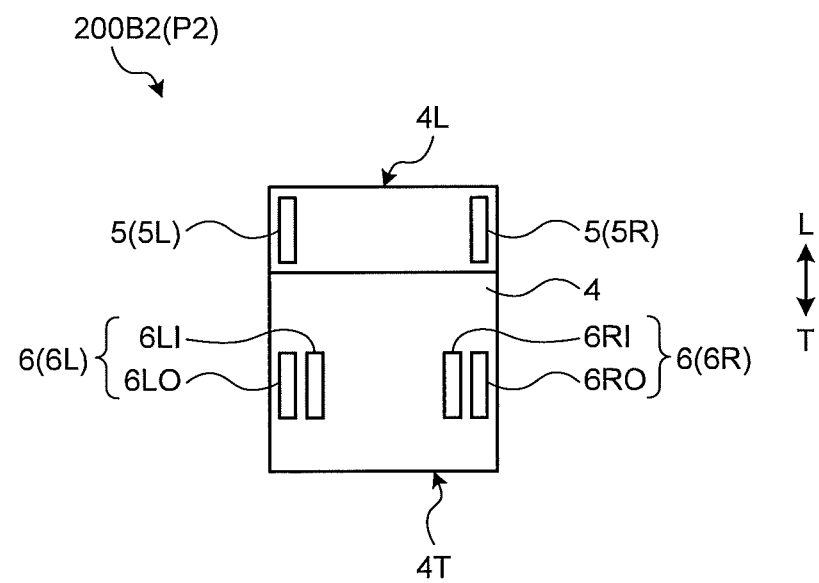
FIG. 10 is a diagram illustrating a second vessel image 200B2.

FIG. 9 is a diagram illustrating a first vessel image 200B1. FIG. 10 is a diagram illustrating a second vessel image 200B2. The reference sign L in FIGS. 9 and 10 indicates the front side of the vessel 4 or the dump truck 1, and the reference sign T indicates the rear side thereof. The first vessel image 200B1 is an image based on the above-described first information P1, and the above-described second vessel image 200B2 is an image based on the second information P2. The first vessel image 200B1 is visualized by displaying, for example, the first information P1 on the monitor 50. Similarly, the second vessel image 200B2 is visualized by displaying, for example, the second information P2 on the monitor 50. In the embodiment, the first information P1 and the second information P2 are, for example, image data based on a bitmap format, but the information items are not limited thereto. These pieces of information may be, for example, image data based on a vector format. Furthermore, the first vessel image 200B1 or the second vessel image 200B2 indicates a front end 4L of the flange portion 4F at the front portion of the vessel 4. It is not essentially to display the front end 4L, but when the front end 4L is displayed, the shape of the entire deck (the vessel 4 and the flange portion 4F) is illustrated.

The first vessel image 200B1 is an image that the vessel 4 in which the rear side T of the dump truck 1 illustrated in FIGS. 1 and 4, that is, a part (the vessel rear portion) 4TP (the range indicated by the diagonal line illustrated in FIG. 9) near a rear end 4T of the vessel 4 is excluded is displayed on, for example, the monitor 50. In the embodiment, a rear end 4T1 of the vessel 4 from which the vessel rear portion 4TP is excluded is present between the rear side T of the rear wheel 6 and the rear end 4T of the vessel 4 from which the vessel rear portion 4TP is not excluded yet. In the embodiment, the first vessel image 200B1 may include at least the vessel 4 from which the vessel rear portion 4TP is excluded. For this reason, for example, the first vessel image 200B1 may further include at least one of a part of the vehicle body portion 2, a part of the cab 3, the inclined ladder 2d, and the like illustrated in FIG. 3.

The second vessel image 200B2 is an image in which the entire vessel 4 included in the dump truck 1 illustrated in FIGS. 1 and 4 is displayed on, for example, the monitor 50. Accordingly, the second vessel image 200B2 also displays the vessel rear portion 4TP which is not displayed in the first vessel image 200B1. In the embodiment, the second vessel image 200B2 may include at least the entire vessel 4. For this reason, for example, the second vessel image 200B2 may further include at least one of a part of the vehicle body portion 2, a part of the cab 3, the inclined ladder 2d, and the like illustrated in FIG. 3.

The first vessel image 200B1 and the second vessel image 200B2 may include at least the vessel 4. However, as illustrated in FIGS. 9 and 10, the front wheels 5 and the rear wheels 6 of the dump truck 1 illustrated in FIG. 1 may be further included, and may be displayed along with the vessel 4. Next, a case will be described in which the front wheels 5 and the rear wheels 6 are included in the first vessel image 200B1 and the second vessel image 200B2. In this case, the entire image of the front wheels 5 and the rear wheels 6 when seen from the direction perpendicular to the respective rotation axes is displayed so as to overlap the first vessel image 200B1 and the second vessel image 200B2. The image of the front wheels 5 and the rear wheels 6 has a rectangular shape. Since the first vessel image 200B1 and the second vessel image 200B2 illustrate the state where the dump truck 1 is seen from the upside, the front wheels 5 and the rear wheels 6 are displayed so as to transparently overlap the vessel 4.

Since at least a part of the front wheels 5 and the rear wheels 6 is displayed on the first vessel image 200B1 and the second vessel image 200B2, the operator of the dump truck 1 may easily recognize the positional relation between the front and rear wheels 5 and 6 and the object (the subject) existing in the periphery of the dump truck 1. The front wheels 5 and the rear wheels 6 may be partially displayed. However, as in the embodiment, when all the front and rear wheels 5 and 6 are displayed, the operator of the dump truck 1 may easily recognize the existence of the front and rear wheels 5 and 6 and the positional relation between the front and rear wheels 5 and 6, the dump truck 1, and the vessel 4 compared to the case where only a part of them is displayed. The front wheels 5 and the rear wheels 6 may be distinguished from the vessel 4 and may be displayed in a color different from that of the vessel 4 or in the same color as that of the vessel 4 with encircling the front wheels 5 and the rear wheels 6 using a line.

The front wheels 5 and the rear wheels 6 are displayed at a position where the front wheels 5 and the rear wheels 6 are disposed when the dump truck 1 is seen from the bird's eye position. In the embodiment, a left front wheel 5L is displayed at the left front side of the vessel 4, a right front wheel 5R is displayed at the right front side of the vessel 4, a left rear wheel 6L is displayed at the left rear side of the vessel 4, and a right rear wheel 6R is displayed at the right rear side of the vessel 4. With such a configuration, the operator of the dump truck 1 may easily recognize the relation between the dump truck 1, the vessel 4, the front wheels 5, and the rear wheels 6.

In a case where the front wheels 5 and the rear wheels 6 are displayed, it is desirable that the first vessel image 200B1 exclude the rear side in relation to the end of the rear wheel 6 at the rear side of the dump truck 1. With such a configuration, the first vessel image 200B1 may display the entire rear wheel 6. Furthermore, in a case where the front wheels 5 and the rear wheels 6 are displayed, the first vessel image 200B1 excluding the vessel 4 from the front side in relation to the end of the rear wheel 6 at the rear side of the dump truck 1 is not excluded. For example, the sixth image capturing device 16 which captures the rear side of the dump truck 1 is disposed between the vessel 4, the left rear wheel 6L, and the right rear wheel 6R. For this reason, the first vessel image 200B1 may exclude the vessel 4 at the rear side of the dump truck 1 from the position of the sixth image capturing device 16. Further, the first vessel image 200B1 may exclude the vessel 4 at the rear side of the dump truck 1 from the position captured by the sixth image capturing device 16. In this way, since the sixth image capturing device 16 may display the entire image capturing area on the first bird's eye image 201 to be described later, the operator of the dump truck 1 may more easily recognize the environment in the periphery of the dump truck 1.

The actual dump truck 1 is set in consideration of the balance of the load (the weight of the vehicle body and the weight of the freight) applied to each tire. For this reason, in the dump truck 1, each front wheel 5 is a single tire, and each rear wheel 6 is a double tire, that is, a tire obtained by arranging two tires in parallel. For this reason, the rear wheels 6, that is, the left rear wheel 6L and the right rear wheel 6R may be displayed so that a plurality of (in the embodiment, two) vehicle wheels 6LO and 6LI and two vehicle wheels 6RO and 6RI are respectively disposed at the left and right sides of the vessel 4. With such a configuration, the operator of the dump truck 1 may easily and intuitively recognize the front and rear sides of the dump truck 1. In the embodiment, each of the left rear wheel 6L and the right rear wheel 6R includes two tires in accordance with the actual dump truck 1, but the number is not limited to two. Further, the width of the rear wheel 6 may be displayed so as to be larger than the width of the front wheel 5. In addition, the front wheels 5 and the rear wheels 6 may be respectively displayed in different colors or the front wheels 5 may be displayed in a flickering manner. Even in this configuration, since the operator of the dump truck 1 may distinguish the rear wheels 6 from the front wheels 5, it is easy to intuitively recognize the front and rear sides of the dump truck 1.

For example, as described above, in a case where the monitor 50 is provided so as to be suspended from the ceiling inside the cab 3 and the monitor 50 is provided at the right side (or the left side) of the operator while the operator sits on the seat, the upper side of the monitor 50 does not match the front side of the dump truck 1. In such a case, it is considered that the operator of the dump truck 1 may not intuitively see the front and rear direction of either the first vessel image 200B or the second vessel image 200B2 displayed on the monitor 50. In such a case, since all the front and rear wheels 5 and 6 are displayed, the operator may easily recognize the front and rear direction of the first vessel image 200B or the second vessel image 200B2 displayed on the monitor 50.

In this way, since the operator of the dump truck 1 may distinguish the rear wheels 6 and the front wheels 5 from each other by respectively displaying the front wheels 5 and the rear wheels 6 in a different manner, it is easy to intuitively recognize the front and rear sides of the dump truck 1. Next, the first bird's eye image 201 and the second bird's eye image 202 will be described.

Figure 11:
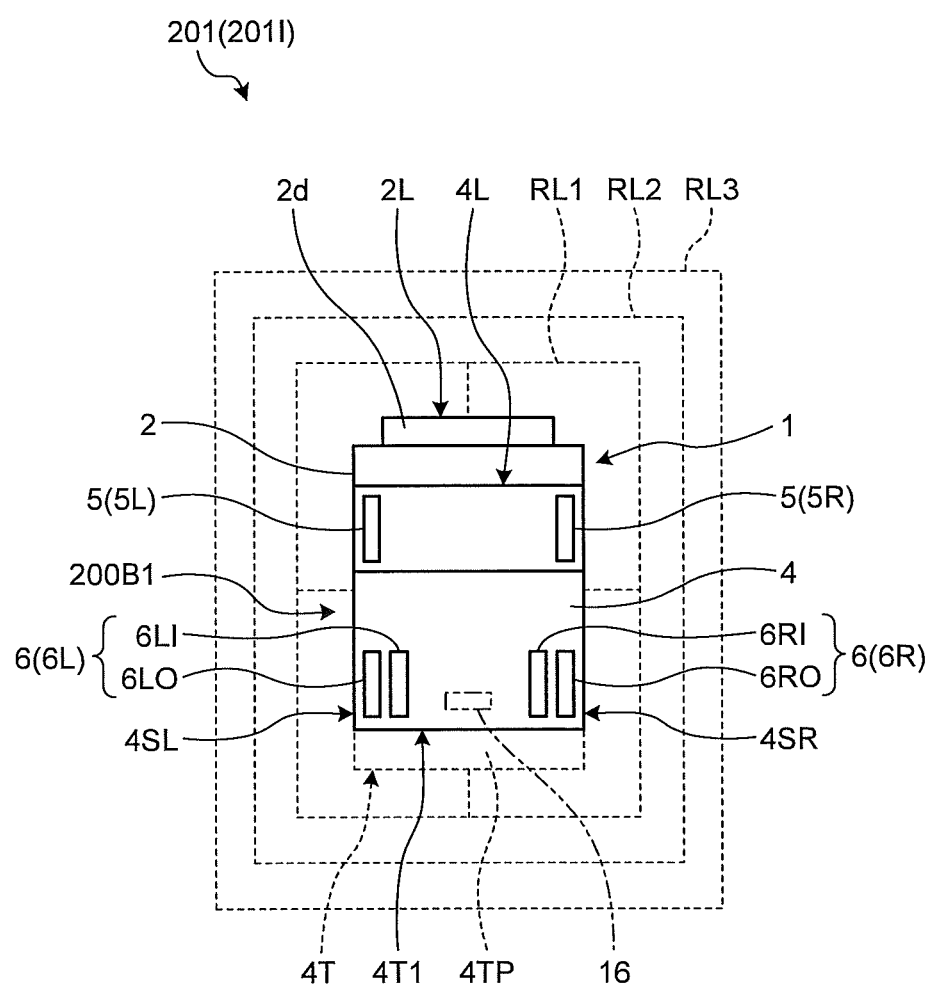
FIG. 11 is a diagram illustrating an example of a first bird's eye image 201.
Figure 12:
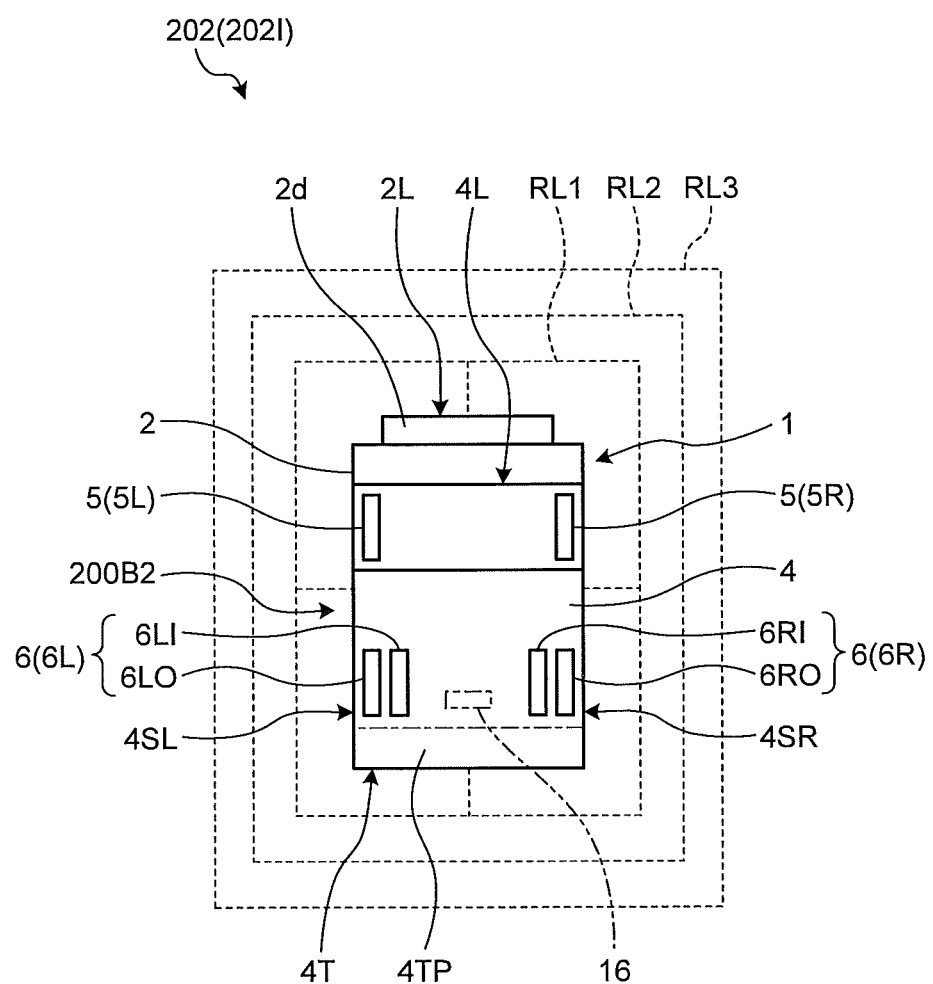
FIG. 12 is a diagram illustrating an example of a second bird's eye image 202.

FIG. 11 is a diagram illustrating an example of the first bird's eye image 201. FIG. 12 is a diagram illustrating an example of the second bird's eye image 202. The first bird's eye image 201 is an image obtained by superimposing the first vessel image 200B1 on the working vehicle area TR of the bird's eye image 200. The second bird's eye image 202 is an image obtained by superimposing the second vessel image 200B2 on the working vehicle area TR of the bird's eye image 200. The first bird's eye image 201 and the second bird's eye image 202 are all displayed and visualized on the monitor 50 by the controller 100. Since the first bird's eye image 201 and the second bird's eye image 202 may be generated by synthesizing the first vessel image 200B1 or the second vessel image 200B2 with the bird's eye image 200 in a superimposing manner, the process load of the controller 100 may be reduced.

The first bird's eye image 201 and the second bird's eye image 202 are all generated by the display control unit 150 of the controller 100 illustrated in FIG. 3, and are displayed on the monitor 50. The display control unit 150 generates a first synthesis image information 201I by the combination of the bird's eye image information 200I generated by the bird's eye image synthesizing unit 110 and the first information P1 generated by the vessel image generating unit 140. Further, the display control unit 150 generates a second synthesis image information 202I by the combination of the bird's eye image information 200I and the second information P2 generated by the vessel image generating unit 140. The first synthesis image information 201I is a piece of information for displaying the first bird's eye image 201 on the monitor 50 and the like, and the second synthesis image information 202I is a piece of information for displaying the second bird's eye image 202 on the monitor 50 and the like.

In the embodiment, the first bird's eye image 201 and the second bird's eye image 202 include a part of the vehicle body portion 2 of the dump truck 1 and the inclined ladder 2d in addition to the vessel 4. The first bird's eye image 201 and the second bird's eye image 202 include a part of the vessel 4, the vehicle body portion 2, and the like and the periphery of the dump truck 1, and these are displayed and visualized on the monitor 50. The periphery of the dump truck 1 is the periphery of a left side portion 4SL, the right side portion 4SR, and the rear ends 4T1 and 4T of the vessel 4 and a front portion 2L of the vehicle body portion 2.

In the embodiment, in the first bird's eye image 201 and the second bird's eye image 202, the dotted lines RL1, RL2, and RL3 are displayed in the periphery of the dump truck 1. The dotted line RL1 is displayed at a position closest to the dump truck 1, and the dotted line RL3 is displayed at a position farthest from the dump truck 1. The dotted line RL2 is displayed between the dotted line RL1 and the dotted line RL3. The dotted lines RL1, RL2, and RL3 respectively indicate the positions distant from the dump truck 1 by a predetermined distance. The operator of the dump truck 1 may recognize the distance between the dump truck 1 and the object (for example, a person or a vehicle such as an automobile) as the object displayed on the first bird's eye image 201 or the second bird's eye image 202 by the dotted lines RL1, RL2, and RL3.

The sixth image capturing device 16 is disposed between the left rear wheel 6L and the right rear wheel 6R at the rear side of the dump truck 1 so as to be positioned below the vessel 4. For this reason, since the sixth image capturing device 16 may capture a part of the lower side of the vessel, the bird's eye image information 200I illustrated in FIG. 8 includes a part of the lower side of the vessel. The first bird's eye image 201 displays the vessel 4 from which the vessel rear portion 4TP is excluded. For this reason, the first bird's eye image 201 displays the lower area of the vessel rear portion 4TP captured by the sixth image capturing device 16. On the contrary, in the second bird's eye image 202, the lower area of the vessel rear portion 4TP is hidden by the vessel rear portion 4TP, but the entire rear end 4T of the vessel 4 is displayed.

Since the first bird's eye image 201 also displays the lower area of the vessel rear portion 4TP, the operator of the dump truck 1 may recognize the environment around the dump truck 1 in more detail. For this reason, when the controller 100 displays the first bird's eye image 201 on the monitor 50 before at least the dump truck 1 is started, the operator may appropriately check the periphery environment. For example, in a case where an object at a height lower than the height of the vessel 4 exists behind the rear wheel 6, it is possible to further reliably monitor the periphery. The second bird's eye image 202 displays the entire rear end 4T of the vessel 4. For this reason, in a case where an object exists behind the vessel 4, the controller 100 displays the second bird's eye image 202 on the monitor 50, and hence the operator of the dump truck 1 may easily recognize the positional relation between the rear end 4T of the vessel 4 and the object. In particular, this is advantageous when the dump truck 1 moves backward. For example, in a case where an object at a height equal to or higher than the height of the rear end 4T of the vessel 4 exists in the periphery of the dump truck 1, it is possible to further reliably monitor the periphery.

The first bird's eye image 201 may display an image showing the lower area of the vessel rear portion 4TP and an image showing the outer peripheral portion of the vessel rear portion 4TP, that is, the rear end 4T. In the example illustrated in FIG. 11, an image indicated by the dotted line is displayed at a portion corresponding to the outer frame of the vessel rear portion 4TP. With such a configuration, the operator of the dump truck 1 may easily recognize the positional relation between the rear end 4T of the vessel 4 and the object in a case where the object exists behind the vessel 4. Furthermore, since the second bird's eye image 202 displays the entire vessel 4, it is considered that the positional relation between the rear end 4T of the vessel 4 and the object may be further easily recognized compared to the case where the outer peripheral portion of the vessel rear portion 4TP is displayed on the first bird's eye image 201. Next, a control example of switching the display of the first bird's eye image 201 and the display of the second bird's eye image 202 will be described.

<Control Example of Switching First Bird's Eye Image and Second Bird's Eye Image>

FIG. 13 is a flowchart illustrating an example of switching the display of the first image (the first bird's eye image 201 (the first vessel image 200B1)) and the display of the second image (the second bird's eye image 202 (the second vessel image 200B2)). In this control example, the display of the first image and the display of the second image are switched on the monitor 50 based on at least one of the operation of the operator of the dump truck 1 and the state of the dump truck 1. More specifically, it is possible to switch the display of the first vessel image 200B1 as the first image and the second vessel image 200B2 as the second image displayed on the monitor 50. Furthermore, as described above, the display of the first bird's eye image 201 as the first image and the display of the second bird's eye image 202 as the second image may be switched. Further, the periphery monitoring system 10 may further reliably monitor the periphery by causing the operator of the dump truck 1 to recognize the environment in the periphery of the dump truck 1 particularly before the dump truck 1 is started. In order to attain the object, it is desirable that the controller 100 displays the first bird's eye image 201 on the monitor 50 in principle and displays the second bird's eye image 202 on the monitor 50 when the condition of switching the display of the monitor 50 is satisfied. Accordingly, in the embodiment, the first bird's eye image 201 is first displayed on the monitor 50, and when the condition of switching the display of the monitor 50 is satisfied, the controller 100 switches the display of the monitor 50 to the second bird's eye image 202.

When executing the control example, in step S101, the controller 100 illustrated in FIG. 3 displays the first bird's eye image 201 on the monitor 50. Furthermore, when the dump truck 1 starts the internal combustion engine (hereinafter, the engine), the first bird's eye image 201 may be essentially displayed on the monitor 50. That is, when the engine is started by the operator who operates a key switch (not illustrated) for starting the engine of the dump truck 1, the controller 100 receives the signal (the engine starting signal) of the key switch as a trigger signal, and the first bird's eye image 201 is displayed on the monitor 50 instead of the second bird's eye image 202. Next, the routine proceeds to step S102, and the display control unit 150 of the controller 100 executes the process of step S103 when the condition of switching the display of the monitor 50 is established (Yes in step S102). In this case, the display control unit 150 of the controller 100 switches the display of the monitor 50 from the first bird's eye image 201 to the second bird's eye image 202. With such a configuration, in step S103, the second bird's eye image 202 is displayed on the monitor 50.

When the condition of switching the display of the monitor 50 is not established (No in step S102), the display control unit 150 executes the process after step S101. That is, the display of the first bird's eye image 201 is continued on the monitor 50. In this way, the condition of switching the display of the monitor 50 in step S102 is the condition (the first condition) that switches the display of the monitor 50 from the first bird's eye image 201 to the second bird's eye image 202.

Next, the routine proceeds to step S104, and the display control unit 150 of the controller 100 executes the process of step S105 when the condition of switching the display of the monitor 50 is established (Yes in step S104). In this case, the display control unit 150 of the controller 100 switches the display of the monitor 50 from the second bird's eye image 202 to the first bird's eye image 201. With such a configuration, in step S105, the monitor 50 displays the first bird's eye image 201.

When the condition of switching the display of the monitor 50 is not established (No in step S104), the display control unit 150 executes the process in step S103 and step S104. For this reason, the display of the second bird's eye image 202 is continued on the monitor 50. In this way, the condition of switching the display of the monitor 50 in step S104 is the condition (the second condition) for switching the display of the monitor 50 from the second bird's eye image 202 to the first bird's eye image 201. Next, the condition for switching the display of the monitor 50, more specifically, the first condition and the second condition will be described.

(Condition for Switching Display of Monitor)

In the condition (which is appropriately referred to as the image switching condition) for switching the display of the monitor 50, the first condition is defined as the condition based on the operation of the operator who operates the dump truck 1. As such an example, for example, the operator switches the display of the monitor 50 according to his/her intension. As an example, the operator operates the image switching switch 39 illustrated in FIG. 3 so that the display of the monitor 50 is switched from the first bird's eye image 201 to the second bird's eye image 202. Then, the image switching switch 39 generates a signal for displaying the second bird's eye image 202 on the monitor 50. In step S103, the display control unit 150 of the controller 100 which receives the signal switches the display of the monitor 50 from the first bird's eye image 201 to the second bird's eye image 202.

In the image switching condition, the second condition is defined as the condition based on the operation of the operator who operates the dump truck 1 and the state of the dump truck 1. In a case of the second condition based on the operation of the operator, the operator switches the display of the monitor 50 according to his/her intension as in the first condition. As an example, the operator operates the image switching switch 39 illustrated in FIG. 3 so as to switch the display of the monitor 50 from the second bird's eye image 202 to the first bird's eye image 201. Then, the image switching switch 39 generates a signal for displaying the first bird's eye image 201 on the monitor 50. In step S105, the display control unit 150 of the controller 100 which receives the signal switches the display of the monitor 50 from the second bird's eye image 202 to the first bird's eye image 201.

In a case of the second condition based on the state of the dump truck 1, for example, the speed (the running speed) at which the dump truck 1 runs may become a predetermined threshold value or less. The running speed includes both running speeds in the forward and backward traveling modes of the dump truck 1. The predetermined threshold value also includes 0. Since the periphery monitoring system 10 causes the operator to recognize the state in the periphery of the dump truck 1 particularly before the dump truck 1 is started, it is desirable that the predetermined threshold value is set to the value at which the dump truck 1 almost stops, but the invention is not limited thereto.

The display control unit 150 of the controller 100 acquires the running speed of the dump truck 1 from a control device (not illustrated) which controls the operation of the dump truck 1. The running speed of the dump truck 1 may be detected by a vehicle speed sensor (not illustrated). Then, when the acquired running speed is a predetermined threshold value or less, in step S105, the display control unit 150 switches the display of the monitor 50 from the second bird's eye image 202 to the first bird's eye image 201. With such a configuration, when the dump truck 1 is stopped, the first bird's eye image 201 may be reliably displayed on the monitor 50. As a result, since the operator may recognize the state in the periphery of the dump truck 1 including the lower state of the vessel rear portion 4TP in more detail before the dump truck 1 is started, it is possible to further reliably realize the periphery monitoring.

Further, in a case of the second condition based on the state of the dump truck 1, for example, the object detection device may detect the object existing behind the dump truck 1 as the object. The object detection device which detects the object existing behind the dump truck 1 is, for example, at least one of the fifth radar device 25, the sixth radar device 26, the seventh radar device 27, and the eighth radar device 28 illustrated in FIG. 6. Furthermore, the second condition may include a case where one object is detected as the object by two radar devices in accordance with the position of the object.

When the display control unit 150 of the controller 100 acquires an information that an object exists behind the dump truck 1 from the object position information generating unit 130 illustrated in FIG. 3, in step S105, the display control unit switches the display of the monitor 50 from the first bird's eye image 202 to the first bird's eye image 201. With such a configuration, when an object exists behind the dump truck 1, the vessel rear portion 4TP is not displayed on the monitor 50, and hence the operator may check the lower state of the vessel rear portion 4TP. As a result, since the operator may recognize the state in the periphery of the dump truck 1 when starting the dump truck 1 in more detail, it is possible to further reliably realize the periphery monitoring.

Further, in a case of the second condition based on the state of the dump truck 1, for example, the traveling mode of the dump truck 1 may be set as the backward traveling mode. This is a case in which, for example, the shift lever 37 illustrated in FIG. 3 is operated to the backward traveling mode by the operator of the dump truck 1. For example, when the shift lever 37 is operated to the backward traveling position, a signal for switching the traveling mode of the dump truck 1 to the backward traveling mode is generated. In step S105, the display control unit 150 of the controller 100 which receives the signal switches the display of the monitor 50 from the second bird's eye image 202 to the first bird's eye image 201. As a result, since the operator may recognize the state in the periphery of the dump truck 1 including the lower state of the vessel rear portion 4TP in more detail before moving the dump truck 1 backward, it is possible to further reliably realize the periphery monitoring. Furthermore, when the traveling mode of the dump truck 1 is set as the forward traveling mode, the display of the monitor 50 may not be switched from the second bird's eye image 202 to the first bird's eye image 201. In this case, when the monitor 50 displays the second bird's eye image 202, the state is maintained.

As described above, in the embodiment, the controller 100 which is included in the periphery monitoring system 10 may switch the display of the first image (at least one of the first vessel image 200B1 and the first bird's eye image 201) and the display of the second image (at least one of the second vessel image 200B2 and the second bird's eye image 202) with respect to the monitor 50. For this reason, since the periphery monitoring system 10 may switch the first bird's eye image 201 to the second bird's eye image 202 by the operation of the operator of the dump truck 1 so that the second bird's eye image is displayed on the monitor 50, the operator may check the image which may be easily understood by the operator through the monitor 50. Further, the operator may easily intuitively recognize the relation between the dump truck 1 and the object existing therearound. In this way, the periphery monitoring system 10 according to the embodiment may provide an image which may be easily understood by the operator.

Further, in the embodiment, the controller 100 which is included in the periphery monitoring system 10 displays the first bird's eye image 201 on the monitor 50 in principle. Then, the controller 100 displays the second bird's eye image 202 on the monitor 50 when there is an operation of the operator. With such a configuration, it is possible to display the image according to the operator's intention on the monitor 50. Further, in the embodiment, since the first bird's eye image 201 excluding the vessel rear portion 4TP and displaying the lower side of the vessel rear portion 4TP is displayed on the monitor 50 in principle, there is an advantage that the range causing the operator to check the periphery using the monitor 50 is extended in the normal state. In the embodiment, the first bird's eye image 201 is displayed on the monitor 50 in principle, but the second bird's eye image 202 may be displayed on the monitor 50 in principle. However, as described above, it is desirable that the first bird's eye image 201 is displayed on the monitor 50 in principle so that the operator may recognize the state in the periphery of the dump truck 1 in more detail.

Further, in the embodiment, the controller 100 which is included in the periphery monitoring system 10 also displays the front wheels 5 and the rear wheels 6 of the dump truck 1 on the first bird's eye image 201 and the second bird's eye image 202. For this reason, since the operator of the dump truck 1 may easily recognize the relation between the positions of the front wheels 5 and the rear wheels 6 and the object existing in the periphery of the dump truck 1, it is possible to further reliably monitor the periphery. In particular, in a case where the vessel rear portion 4TP is excluded from the vessel 4, when the rear wheel 6 is displayed, the operator may recognize the object existing behind the rear wheel 6 by the relation with respect to the rear wheels 6, and hence it is easy to recognize the object at an early timing by the appropriate relative positional relation. In this way, since the periphery monitoring system 10 displays the front wheels 5 and the rear wheels 6 on the first bird's eye image 201 and the second bird's eye image 202, it is possible to provide an image which may be easily understood by the operator of the dump truck 1 when the running operation is assisted by the bird's eye image synthesized with the images captured by the plurality of image capturing devices.

Further, in the embodiment, the controller 100 which is included in the periphery monitoring system 10 displays the front wheels 5 and the rear wheels 6 on the monitor 50 in a different manner. With such a configuration, since the operator of the dump truck 1 may easily determine the front and rear sides of the dump truck 1, it is easy to intuitively recognize the relation between the dump truck 1 operated by the operator and the object existing therearound. Particularly, when the monitor 50 is disposed at the lateral side instead of the front side of the operator due to the layout inside the cab 3, the operator needs to check the monitor 50 by directing his/her head toward the monitor 50. In such a case, the operator may not easily recognize the direction of the dump truck 1. However, as in the embodiment, when the front wheel 5 and the rear wheel 6 are displayed on the monitor 50 in a different manner, there is an advantage that the operator may easily and reliably recognize the front and rear sides of the dump truck 1.

The periphery monitoring system 10 uses the wide dynamic camera as the image capturing devices 11 to 16. For this reason, the image capturing devices 11 to 16 may brightly correct a dark portion like a shadow of the dump truck 1 while keeping a level at which the bright portion may be seen. Accordingly, black saturation and white-out do not easily occur in the images captured by the image capturing devices 11 to 16, and hence the images may be easily understood as a whole. As a result, the periphery monitoring system 10 which includes the image capturing devices 11 to 16 may display the first bird's eye image 201 or the second bird's eye image 202 in which an object such as a vehicle existing in the area as the shadow of the dump truck 1 is easily seen on the monitor 50. In this way, the periphery monitoring system 10 may display the object in the periphery of the dump truck 1 on the first bird's eye image 201 or the second bird's eye image 202 even in an environment in which the contrast difference in contrast is large when monitoring the periphery of the dump truck 1 by using the images captured by the image capturing devices 11 to 16. As a result, the operator of the dump truck 1 may reliably see the object existing in the periphery of the dump truck 1, particularly, the area as the shadow regardless of the environment.

In this way, since the periphery monitoring system 10 may generate the first bird's eye image 201 and the second bird's eye image 202 that reliably display the object in the periphery of the dump truck 1 even in an environment in which the contrast difference in contrast is large, it is possible to reliably see the object existing in the dead angle of the operator by the first bird's eye image 201 or the second bird's eye image 202. Accordingly, the periphery monitoring system 10 is very effective when monitoring the periphery of the above-described superjumbo dump truck 1 used in a mine. That is, there is a case in which the dump truck 1 may form an area as a very large shadow and move while forming an area as a shadow. In this case, the area as the shadow largely changes due to the elevation of the vessel 4 and the area as the dead angle is large. The periphery monitoring system 10 generates the first bird's eye image 201 or the second bird's eye image 202 which reliably displays the object in the periphery of the dump truck 1 in such the dump truck 1 and hence provides an accurate information item on the periphery of the dump truck 1 for the operator of the dump truck 1. Further, the periphery monitoring system 10 may provide accurate information on the periphery of the dump truck 1 for the operator of the dump truck 1 in a case of the dump truck 1 which is operated in a place where the illuminance difference between a sunny area and a shadow area is very large as in the equatorial zone.

While the embodiment has been described, the embodiment is not limited to the above-described content. Further, the above-described constituents include a constituent that is easily supposed by the person skilled in the art, a constituent that has substantially the same configuration, and a constituent that is included in a so-called equivalent scope. Further, the above-described constituents may be appropriately combined with each other. Furthermore, the constituents may be omitted, replaced, or modified in various forms in the scope without departing from the gist of the embodiment.

REFERENCE SIGNS LIST

1 DUMP TRUCK
2 VEHICLE BODY PORTION
2L FRONT PORTION
2c, 2d LADDER
2e GUARDRAIL
2f FRAME
3 CAB
4 VESSEL
4T, 4T1 REAR END
4TP VESSEL REAR PORTION
5 FRONT WHEEL
6 REAR WHEEL
6LI, 6LO, 6RI, 6RO VEHICLE WHEEL
10 WORKING VEHICLE PERIPHERY MONITORING SYSTEM (PERIPHERY MONITORING SYSTEM)
11, 12, 13, 14, 15, 16 IMAGE CAPTURING DEVICE
21, 22, 23, 24, 25, 26, 27, 28 RADAR DEVICE
31 DRIVER SEAT
39 IMAGE SWITCHING SWITCH
50 MONITOR
100 CONTROLLER
110 BIRD'S EYE IMAGE SYNTHESIZING UNIT
120 CAMERA IMAGE SWITCHING/VIEWING POINT CHANGING UNIT
130 OBJECT POSITION INFORMATION GENERATING UNIT
140 VESSEL IMAGE GENERATING UNIT
150 DISPLAY CONTROL UNIT

210 OBJECT INFORMATION COLLECTING UNIT
220 OBJECT PROCESSING UNIT

The invention claimed is:

1. A dump truck periphery monitoring system that monitors a periphery of a dump truck including a vehicle body frame which supports front and rear wheels and a vessel which protrudes toward a rear side of the vehicle body frame than the rear wheels to load freight thereon, the dump truck periphery monitoring system comprising:
 a plurality of image capturing devices each of which is attached to the dump truck and captures the periphery of the dump truck to output a piece of image information, the image capturing devices including a rear-side image capturing device which is disposed below the vessel, an imaging range of the rear-side image capturing device including a lower area of the vessel;
 a bird's eye image synthesizing unit that acquires a plurality pieces of the image information and synthesizes the acquired image information to generate bird's eye image information for displaying a bird's eye image of the dump truck and the periphery of the dump truck on a display device;
 a display control unit that switches, on the display device, a display of one of
  a first image obtained by superimposing;
   a first vessel image including the vessel and excluding an entire vessel of a rear-side part of the vessel than an end of the rear wheel; and
   the bird's eye image in which the first vessel image is positioned at an area the dump truck is present, so that a lower area of a rear portion of the vessel corresponding to and positioned at the rear-side part of the vessel in the first vessel image is displayed as a part of the bird's eye image, and
  a second image obtained by superimposing a second vessel image including all of the vessel at the area in the bird's eye image; and
 a determination unit that determines whether a running speed at which the dump truck runs becomes a predetermined threshold value or less,
 wherein the display control unit displays the first image on the display device when the running speed at which the dump truck runs becomes the predetermined threshold value or less, and displays the second image on the display device when the running speed at which the dump truck runs becomes larger than the predetermined threshold value.

2. The working vehicle periphery monitoring system according to claim 1, wherein the display control unit switches the display of the first image and the display of the second image based on an operation of an image switching switch by an operator that operates the working vehicle.

3. The working vehicle periphery monitoring system according to claim 1, wherein the display control unit switches the display of the first image and the display of the second image according to a state of the working vehicle.

4. A dump truck periphery monitoring system that monitors a periphery of a dump truck including a vehicle body frame which supports front and rear wheels and a vessel which protrudes toward a rear side of the vehicle body frame than the rear wheels to load freight thereon, the dump truck periphery monitoring system comprising:
 a plurality of image capturing devices each of which is attached to the dump truck and captures the periphery of the dump truck to output a piece of image information, the image capturing devices including a rear-side image capturing device which is disposed below the vessel, an imaging range of the rear-side image capturing device including a lower area of the vessel;
 a bird's eye image synthesizing unit that acquires a plurality pieces of the image information and synthesizes the acquired image information to generate bird's eye image information for displaying a bird's eye image of the dump truck and the periphery of the dump truck on a display device;
 a display control unit that switches, on the display device, a display of one of
  a first image obtained by superimposing;
   a first vessel image including the vessel and excluding an entire vessel of a rear-side part of the vessel than an end of the rear wheel; and
   the bird's eye image in which the first vessel image is positioned at an area the dump truck is present, so that a lower area of a rear portion of the vessel corresponding to and positioned at the rear-side part of the vessel in the first vessel image is displayed as a part of the bird's eye image, and
  a second image obtained by superimposing a second vessel image including all of the vessel at the area in the bird's eye image; and
 wherein the dump truck includes an object detection device that detects an object existing behind the dump truck,
 wherein the dump truck periphery monitoring system comprises a determination unit that determines whether the object detection device detects the object, and
 wherein the display control unit displays the first image on the display device when the determination unit determines that the object detection device detects the object, and displays the second image on the display device when the determination unit does not determine that the object detection device detects the object.

5. A dump truck periphery monitoring system that monitors a periphery of a dump truck including a vehicle body frame which supports front and rear wheels and a vessel which protrudes toward a rear side of the vehicle body frame than the rear wheels to load freight thereon, the dump truck periphery monitoring system comprising:
 a plurality of image capturing devices each of which is attached to the dump truck and captures the periphery of the dump truck to output a piece of image information, the image capturing devices including a rear-side image capturing device which is disposed below the vessel, an imaging range of the rear-side image capturing device including a lower area of the vessel;
 bird's eye image synthesizing unit that acquires a plurality pieces of the image information and synthesizes the acquired image information to generate bird's eye image information for displaying a bird's eye image of the dump truck and the periphery of the dump truck on a display device;
 a display control unit that switches, on the display device, a display of one of
  a first image obtained by superimposing;
   a first vessel image including the vessel and excluding an entire vessel of a rear-side part of the vessel than an end of the rear wheel; and
   the bird's eye image in which the first vessel image is positioned at an area the dump truck is present, so that a lower area of a rear portion of the vessel corresponding to and positioned at the rear-side part of the vessel in the first vessel image is displayed as a part of the bird's eye image, and a second image obtained by superimposing a second vessel image including all of the vessel at the area in the bird's eye image; and wherein a determination unit that determines whether a traveling mode of the dump truck becomes a reverse traveling mode, and wherein the display control unit displays the first image on the display device when the determination unit determines that the traveling mode of the dump truck becomes a reverse traveling mode, and displays the second image on the display device when the determination unit does not determine that the traveling mode of the dump truck becomes the reverse traveling mode.

6. The working vehicle periphery monitoring system according to claim 1, wherein the first vessel image includes the front and rear wheels displayed with the vessel, and the second vessel image includes the front and rear wheels displayed with the vessel.

7. The working vehicle periphery monitoring system according to claim 6, wherein the display control unit displays all of the front and rear wheels.

8. The working vehicle periphery monitoring system according to claim 6, wherein as the rear wheels, a plurality of vehicle wheels are displayed at each of left and right sides of the vessel.

9. The working vehicle periphery monitoring system according to claim 6, wherein in the first vessel image, a rear side of the vessel more rear than an end of the rear wheel at the rear side of the working vehicle is excluded.

10. A working vehicle comprising:
the working vehicle periphery monitoring system according to claim 1.

11. The working vehicle periphery monitoring system according to claim 1, wherein the first image includes a display indicating a portion corresponding to an outer frame of the rear portion of the vessel.

12. A working vehicle comprising:
the working vehicle periphery monitoring system according to claim 11.

* * * * *